(12) United States Patent
Cao

(10) Patent No.: US 12,506,416 B2
(45) Date of Patent: Dec. 23, 2025

(54) SYSTEMS AND METHODS FOR ADJUSTING OUTPUT VOLTAGES WITH OUTPUT VOLTAGE DETECTION ON SECONDARY SIDES OF POWER CONVERTERS

(71) Applicant: ON-BRIGHT ELECTRONICS (SHANGHAI) CO., LTD., Shanghai (CN)

(72) Inventor: Yaming Cao, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 545 days.

(21) Appl. No.: 17/872,581

(22) Filed: Jul. 25, 2022

(65) Prior Publication Data
US 2023/0033953 A1    Feb. 2, 2023

(30) Foreign Application Priority Data
Jul. 29, 2021    (CN) .......................... 202110865735.0

(51) Int. Cl.
*H02M 3/335*    (2006.01)
*H02M 1/08*    (2006.01)

(52) U.S. Cl.
CPC ......... *H02M 3/33592* (2013.01); *H02M 1/08* (2013.01)

(58) Field of Classification Search
CPC ...... H02M 1/08; H02M 1/32; H02M 3/33523; H02M 3/33592; Y02B 70/10
See application file for complete search history.

(56) References Cited

U.S. PATENT DOCUMENTS 6,069,804 A    5/2000    Ingman et al.
6,091,233 A    7/2000    Hwang et al.
(Continued)

FOREIGN PATENT DOCUMENTS

CA    2757275 C  *  1/2015    ............... H02J 7/35
CN    2529442 Y     1/2003
(Continued)

OTHER PUBLICATIONS

CN-111697838-A Machine translation (Year: 2020).*
(Continued)

*Primary Examiner* — Thienvu V Tran
*Assistant Examiner* — Yahveh Comas Torres
(74) *Attorney, Agent, or Firm* — Faegre Drinker Biddle & Reath LLP

(57) ABSTRACT

System and method for controlling synchronous rectification. For example, a system for controlling synchronous rectification, the system comprising: a first controller terminal configured to receive a first voltage; and a second controller terminal biased to a second voltage; wherein the system is further configured to: if a voltage difference from the first controller terminal to the second controller terminal satisfies one or more first conditions, generate a first current to flow through the first controller terminal; and if the voltage difference from the first controller terminal to the second controller terminal satisfies one or more second conditions, generate a second current to flow through the second controller terminal; wherein: the voltage difference from the first controller terminal to the second controller terminal is equal to the first voltage minus the second voltage; the one or more first conditions and the one or more second conditions are different.

16 Claims, 10 Drawing Sheets

(56) References Cited

U.S. PATENT DOCUMENTS

| | | |
|---|---|---|
| 6,198,638 B1 | 3/2001 | Lee |
| 6,972,969 B1 | 12/2005 | Shteynberg et al. |
| 7,173,835 B1 | 2/2007 | Yang |
| 7,447,049 B2 | 11/2008 | Garner et al. |
| 7,768,801 B2 | 8/2010 | Usui et al. |
| 7,791,903 B2 | 9/2010 | Zhang et al. |
| 7,826,237 B2 | 11/2010 | Zhang et al. |
| 7,869,231 B2 | 1/2011 | Cohen |
| 7,952,894 B2 | 5/2011 | Lin et al. |
| 8,102,676 B2 | 1/2012 | Huynh et al. |
| 8,134,851 B2 | 3/2012 | Soldano et al. |
| 8,391,028 B2 | 3/2013 | Yeh |
| 8,542,507 B2 | 9/2013 | Hsu et al. |
| 8,570,772 B2 | 10/2013 | Morris et al. |
| 8,953,342 B2 | 2/2015 | Fang |
| 9,397,577 B2* | 7/2016 | Wang ............... H02M 3/33507 |
| 9,413,246 B2 | 8/2016 | Luo et al. |
| 9,595,874 B2 | 3/2017 | Cao et al. |
| 9,602,006 B2 | 3/2017 | Fahlenkamp |
| 9,608,532 B2 | 3/2017 | Wong et al. |
| 9,787,198 B1 | 10/2017 | Cao et al. |
| 9,979,309 B1* | 5/2018 | Green ................... H02M 1/08 |
| 10,003,268 B2 | 6/2018 | Fang et al. |
| 10,063,131 B2 | 8/2018 | Yang et al. |
| 10,063,153 B2 | 8/2018 | Fang |
| 10,122,284 B2 | 11/2018 | Fang |
| 10,148,189 B2 | 12/2018 | Cao et al. |
| 10,158,297 B1* | 12/2018 | Gong ............. H02M 3/33592 |
| 10,158,298 B2* | 12/2018 | Lin ...................... H02M 3/335 |
| 10,193,451 B2 | 1/2019 | Luo et al. |
| 10,270,354 B1 | 4/2019 | Lu et al. |
| 10,411,604 B2 | 9/2019 | Cao et al. |
| 10,411,605 B2 | 9/2019 | Cao et al. |
| 10,432,096 B2 | 10/2019 | Fang et al. |
| 10,432,104 B2 | 10/2019 | Li et al. |
| 10,483,856 B2 | 11/2019 | Cao et al. |
| 10,505,442 B2 | 12/2019 | Wong et al. |
| 10,516,341 B1 | 12/2019 | Fu et al. |
| 10,530,235 B1* | 1/2020 | Hwang ............ H02M 3/33592 |
| 10,608,544 B2* | 3/2020 | Moon .............. H02M 3/33592 |
| 10,622,902 B2 | 4/2020 | Cao et al. |
| 10,622,903 B2 | 4/2020 | Cao et al. |
| 10,651,747 B2 | 5/2020 | Cao et al. |
| 10,756,640 B1 | 8/2020 | Radic et al. |
| 10,819,211 B2 | 10/2020 | Yang et al. |
| 10,868,473 B2* | 12/2020 | Chang ................... H02M 1/08 |
| 11,005,364 B1 | 5/2021 | Radic |
| 11,005,382 B2* | 5/2021 | Hara ...................... H02M 1/36 |
| 11,245,327 B2* | 2/2022 | Feng ..................... H02M 1/08 |
| 11,356,030 B2* | 6/2022 | Miao .................. H02M 1/0054 |
| 11,581,815 B2 | 2/2023 | Cao et al. |
| 11,588,405 B2 | 2/2023 | Cao et al. |
| 11,757,366 B2 | 9/2023 | Cao et al. |
| 11,764,684 B2 | 9/2023 | Cao et al. |
| 11,764,697 B2 | 9/2023 | Zhao et al. |
| 12,047,007 B2 | 7/2024 | Lin et al. |
| 12,095,379 B2 | 9/2024 | Zhao |
| 12,261,541 B2 | 3/2025 | Cao et al. |
| 12,267,021 B2 | 4/2025 | Zhao et al. |
| 12,323,066 B2 | 6/2025 | Lin et al. |
| 2002/0114172 A1 | 8/2002 | Webb et al. |
| 2003/0117119 A1 | 6/2003 | Bridge |
| 2004/0125621 A1* | 7/2004 | Yang ............... H02M 3/33592 |
| | | 363/21.14 |
| 2004/0257834 A1 | 12/2004 | Kazem |
| 2005/0024897 A1 | 2/2005 | Yang et al. |
| 2005/0057951 A1 | 3/2005 | Berghegger |
| 2006/0018135 A1* | 1/2006 | Yang ............... H02M 3/33592 |
| | | 363/21.14 |
| 2007/0014133 A1 | 1/2007 | Shao et al. |
| 2007/0139095 A1 | 6/2007 | Fang et al. |
| 2008/0037302 A1 | 2/2008 | Yang |
| 2008/0309312 A1 | 12/2008 | Lin et al. |
| 2009/0168464 A1 | 7/2009 | Lin et al. |
| 2009/0257644 A1 | 10/2009 | Dodzin et al. |
| 2009/0322300 A1 | 12/2009 | Melanson et al. |
| 2010/0008106 A1 | 1/2010 | Kawabe et al. |
| 2010/0027298 A1* | 2/2010 | Cohen ............... H02M 3/33592 |
| | | 363/21.14 |
| 2010/0128501 A1 | 5/2010 | Huang et al. |
| 2010/0219802 A1 | 9/2010 | Lin et al. |
| 2011/0002145 A1 | 1/2011 | Halberstadt |
| 2011/0019446 A1 | 1/2011 | Wu et al. |
| 2011/0044076 A1 | 2/2011 | Zhang et al. |
| 2011/0157919 A1 | 6/2011 | Yedevelly et al. |
| 2011/0169463 A1 | 7/2011 | Yang et al. |
| 2011/0305055 A1 | 12/2011 | Hsu et al. |
| 2012/0032708 A1 | 2/2012 | Coleman |
| 2012/0075891 A1 | 3/2012 | Zhang et al. |
| 2012/0300506 A1 | 11/2012 | Lee et al. |
| 2012/0300520 A1 | 11/2012 | Ren et al. |
| 2013/0033236 A1 | 2/2013 | Li et al. |
| 2013/0235620 A1* | 9/2013 | Morris ................. H02M 3/335 |
| | | 363/21.12 |
| 2013/0258723 A1 | 10/2013 | Fang et al. |
| 2013/0272036 A1 | 10/2013 | Fang |
| 2014/0021786 A1 | 1/2014 | Fang |
| 2014/0131843 A1* | 5/2014 | Balakrishnan .... H02M 3/33507 |
| | | 257/666 |
| 2014/0204625 A1 | 7/2014 | Liu et al. |
| 2014/0218976 A1 | 8/2014 | Luo et al. |
| 2014/0368254 A1 | 12/2014 | Lee et al. |
| 2014/0376272 A1 | 12/2014 | Miao |
| 2015/0070944 A1 | 3/2015 | Fang |
| 2015/0229223 A1* | 8/2015 | Cao ....................... H02M 1/08 |
| | | 363/21.13 |
| 2015/0249380 A1 | 9/2015 | Hayakawa et al. |
| 2015/0280584 A1 | 10/2015 | Gong et al. |
| 2016/0141961 A1 | 5/2016 | Odell et al. |
| 2016/0149499 A1 | 5/2016 | Fang |
| 2016/0322909 A1 | 11/2016 | Cao et al. |
| 2017/0005578 A1 | 1/2017 | Luo et al. |
| 2017/0063246 A1* | 3/2017 | Kong ............... H02M 3/33592 |
| 2017/0126138 A1 | 5/2017 | Cao et al. |
| 2017/0155322 A1 | 6/2017 | Zhang et al. |
| 2017/0155335 A1* | 6/2017 | Chang ................... H02M 1/36 |
| 2017/0222569 A1 | 8/2017 | Choi et al. |
| 2017/0264287 A1 | 9/2017 | Osanai |
| 2017/0353099 A1 | 12/2017 | Yang et al. |
| 2018/0013352 A1 | 1/2018 | Cao et al. |
| 2018/0034377 A1 | 2/2018 | Cao et al. |
| 2018/0076720 A1 | 3/2018 | Cao et al. |
| 2018/0212527 A1 | 7/2018 | Kong et al. |
| 2018/0248488 A1 | 8/2018 | Cao et al. |
| 2018/0294735 A1 | 10/2018 | Song et al. |
| 2019/0020282 A1 | 1/2019 | Li et al. |
| 2019/0068073 A1 | 2/2019 | Cao et al. |
| 2019/0393767 A1 | 12/2019 | Hwang et al. |
| 2019/0393790 A1 | 12/2019 | Cao et al. |
| 2020/0036293 A1* | 1/2020 | Kannan ............ H02M 3/33523 |
| 2020/0112266 A1* | 4/2020 | Hara ................ H02M 3/33523 |
| 2020/0161985 A1* | 5/2020 | Li ........................... H02M 1/08 |
| 2020/0280259 A1 | 9/2020 | Cao et al. |
| 2020/0280260 A1 | 9/2020 | Cao et al. |
| 2020/0336071 A1 | 10/2020 | Iorio et al. |
| 2020/0343810 A1 | 10/2020 | Xu et al. |
| 2021/0091675 A1* | 3/2021 | Rajesh ............. H02M 3/33507 |
| 2021/0226540 A1 | 7/2021 | Zhao et al. |
| 2021/0376746 A1* | 12/2021 | Cao ....................... H02M 1/08 |
| 2021/0384841 A1* | 12/2021 | Huang ................. H02M 1/348 |
| 2022/0006392 A1 | 1/2022 | Chen et al. |
| 2022/0294355 A1 | 9/2022 | Lin et al. |
| 2022/0329171 A1 | 10/2022 | Zhao et al. |
| 2023/0010393 A1 | 1/2023 | Zhao |
| 2024/0063724 A1 | 2/2024 | Cao et al. |
| 2024/0072678 A1 | 2/2024 | Zhao et al. |
| 2024/0421714 A1 | 12/2024 | Lin et al. |

(56) References Cited

U.S. PATENT DOCUMENTS

| | | | |
|---|---|---|---|
| 2025/0055380 A1 | 2/2025 | Zhao et al. | |
| 2025/0125738 A1 | 4/2025 | Zhao et al. | |

FOREIGN PATENT DOCUMENTS

| | | | | |
|---|---|---|---|---|
| CN | 101106333 | A | 1/2008 | |
| CN | 101188384 | A | 5/2008 | |
| CN | 101272089 | A | 9/2008 | |
| CN | 101378232 | A | 3/2009 | |
| CN | 201238265 | Y | 5/2009 | |
| CN | 201435677 | Y | 3/2010 | |
| CN | 101841247 | A | 9/2010 | |
| CN | 102017376 | A | 4/2011 | |
| CN | 102104338 | A | 6/2011 | |
| CN | 102217181 | A | 10/2011 | |
| CN | 102231605 | A | 11/2011 | |
| CN | 102647074 | A | 8/2012 | |
| CN | 102723856 | A | 10/2012 | |
| CN | 102790531 | A | 11/2012 | |
| CN | 102882377 | A | 1/2013 | |
| CN | 103296867 | A | 9/2013 | |
| CN | 103378751 | A | 10/2013 | |
| CN | 103501112 | A | 1/2014 | |
| CN | 103728572 | A | 4/2014 | |
| CN | 103887980 | A | 6/2014 | |
| CN | 102185501 | B | 9/2014 | |
| CN | 104300793 | A | 1/2015 | |
| CN | 104393763 | A | 3/2015 | |
| CN | 105322800 | A | 2/2016 | |
| CN | 105356727 | A | 2/2016 | |
| CN | 106026703 | A | 10/2016 | |
| CN | 107104598 | A | 8/2017 | |
| CN | 206379873 | U | 8/2017 | |
| CN | 107342691 | A | 11/2017 | |
| CN | 107579670 | A | 1/2018 | |
| CN | 107872158 | A | 4/2018 | |
| CN | 107979289 | A | 5/2018 | |
| CN | 108566104 | A | 9/2018 | |
| CN | 105846695 | B | 11/2018 | |
| CN | 108736749 | A | 11/2018 | |
| CN | 108880296 | A | 11/2018 | |
| CN | 109274272 | A | 1/2019 | |
| CN | 106130349 | B | 3/2019 | |
| CN | 109802559 | A | 5/2019 | |
| CN | 110620514 | A | 12/2019 | |
| CN | 209913730 | U | 1/2020 | |
| CN | 110896283 | A | 3/2020 | |
| CN | 110995013 | A | 4/2020 | |
| CN | 111146961 | A | 5/2020 | |
| CN | 111193407 | A | 5/2020 | |
| CN | 111404403 | A | 7/2020 | |
| CN | 211296573 | U | * 8/2020 | |
| CN | 111697838 | A | * 9/2020 | .......... H02M 1/0012 |
| CN | 111865095 | A | 10/2020 | |
| CN | 112688570 | A | 4/2021 | |
| CN | 112803773 | A | 5/2021 | |
| EP | 2525480 | A1 | 11/2012 | |
| JP | 2000-014136 | A | 1/2000 | |
| JP | 2007-028894 | A | 2/2007 | |
| JP | 2009-124296 | A | 6/2009 | |
| JP | 2009-261042 | A | 11/2009 | |
| JP | 2009-278717 | A | 11/2009 | |
| JP | 5285602 | B2 | 9/2013 | |
| JP | 6351787 | B2 | 7/2018 | |
| TW | 200717978 | A | 5/2007 | |
| TW | I366335 | B | 6/2012 | |
| TW | 201234854 | A | 8/2012 | |
| TW | I401866 | B | 7/2013 | |
| TW | I436571 | B | 5/2014 | |
| TW | I448064 | B | 8/2014 | |
| TW | 201521347 | A | 6/2015 | |
| TW | I489751 | B | 6/2015 | |
| TW | 201537882 | A | 10/2015 | |
| TW | I509971 | B | 11/2015 | |
| TW | 201707361 | A | 2/2017 | |
| TW | I625924 | B | 6/2018 | |
| TW | I635699 | B | 9/2018 | |
| TW | 201919322 | A | 5/2019 | |
| TW | 201933752 | A | 8/2019 | |
| TW | 201937834 | A | 9/2019 | |
| TW | 202002494 | A | 1/2020 | |
| TW | 202019066 | A | 5/2020 | |
| TW | 202110051 | A | 3/2021 | |
| TW | 202114333 | A | 4/2021 | |

OTHER PUBLICATIONS

CN-211296573-U Machine translation (Year: 2020).*
United States Patent and Trademark Office, Notice of Allowance mailed Nov. 27, 2024, in U.S. Appl. No. 18/229,596.
United States Patent and Trademark Office, Notice of Allowance mailed Nov. 7, 2024, in U.S. Appl. No. 18/225,512.
United States Patent and Trademark Office, Office Action mailed Sep. 11, 2024, in U.S. Appl. No. 17/714,821.
Taiwan Intellectual Property Office, Office Action mailed Oct. 11, 2022, in Application No. 110136342.
United States Patent and Trademark Office, Notice of Allowance mailed Oct. 19, 2022, in U.S. Appl. No. 16/503,916.
United States Patent and Trademark Office, Notice of Allowance mailed Oct. 3, 2022, in U.S. Appl. No. 16/787,869.
United States Patent and Trademark Office, Office Action mailed Oct. 14, 2022, in U.S. Appl. No. 16/786,372.
United States Patent and Trademark Office, Office Action mailed Oct. 17, 2022, in U.S. Appl. No. 17/333,844.
United States Patent and Trademark Office, Office Action mailed Feb. 29, 2024, in U.S. Appl. No. 18/225,512.
United States Patent and Trademark Office, Notice of Allowance mailed Aug. 2, 2024, in U.S. Appl. No. 18/229,596.
United States Patent and Trademark Office, Notice of Allowance mailed Jul. 24, 2024, in U.S. Appl. No. 18/225,512.
United States Patent and Trademark Office, Office Action mailed May 29, 2024, in U.S. Appl. No. 17/714,821.
Chinese Patent Office, Office Action issued Mar. 16, 2023, in Application No. 202010471872.1.
Taiwan Intellectual Property Office, Office Action mailed Nov. 11, 2022, in Application No. 110142621.
United States Patent and Trademark Office, Notice of Allowance mailed Feb. 2, 2023, in U.S. Appl. No. 17/333,844.
United States Patent and Trademark Office, Notice of Allowance mailed Jan. 20, 2023, in U.S. Appl. No. 17/152,418.
United States Patent and Trademark Office, Notice of Allowance mailed Mar. 15, 2023, in U.S. Appl. No. 17/333,844.
United States Patent and Trademark Office, Notice of Allowance mailed Mar. 29, 2023, in U.S. Appl. No. 16/786,372.
Chinese Patent Office, Office Action issued Apr. 6, 2022, in Application No. 202110771012.4.
Chinese Patent Office, Office Action issued Dec. 20, 2017, in Application No. 201610345719.8.
Chinese Patent Office, Office Action issued Dec. 30, 2021, in Application No. 202110379198.9.
Chinese Patent Office, Office Action issued Jan. 26, 2014, in Application No. 201210118202.7.
Chinese Patent Office, Office Action issued Jul. 5, 2022, in Application No. 202110865735.0.
Chinese Patent Office, Office Action issued Mar. 1, 2022, in Application No. 202110379198.9.
Chinese Patent Office, Office Action issued Mar. 19, 2021, in Application No. 202010063404.0.
Chinese Patent Office, Office Action issued Mar. 29, 2022, in Application No. 202110263198.2.
Chinese Patent Office, Office Action issued May 25, 2016, in Application No. 201410729533.3.
Chinese Patent Office, Office Action issued Nov. 2, 2021, in Application No. 202110263198.2.
Chinese Patent Office, Office Action issued Nov. 9, 2018, in Application No. 201710534527.6.
Chinese Patent Office, Office Action issued Oct. 28, 2015, in Application No. 201410093010.4.

(56) References Cited

OTHER PUBLICATIONS

Chinese Patent Office, Office Action issued Sep. 4, 2018, in Application No. 201710102817.3.
Li, Longwen, "Newest Switch Power Supply Design Procedures and Steps," Chapter 8, Section 4, pp. 455-458, 2008.
Liu, Shengli, "Practical New Technology of High Frequency Switch Power Supply," Chapter 6, pp. 100-117, 2006.
Ren, Zhicheng and Zhou, Zhong, "Principle and Application Guide for Electric Power Digital Meters," pp. 88-89 entitled "TOP221Y Switching Power Supply Voltage Regulator Chip," China Electric Power Publishing: Beijing, China; 2007.
Taiwan Intellectual Property Office, Office Action issued Apr. 13, 2022, in Application No. 110129676.
Taiwan Intellectual Property Office, Office Action issued Dec. 2, 2016, in Application No. 104101330.
Taiwan Intellectual Property Office, Office Action issued Dec. 27, 2017, in Application No. 106111598.
Taiwan Intellectual Property Office, Office Action issued Feb. 23, 2021, in Application No. 109128639.
Taiwan Intellectual Property Office, Office Action issued Mar. 8, 2021, in Application No. 109110084.
Taiwan Intellectual Property Office, Office Action issued May 3, 2022, in Application No. 110138601.
Taiwan Intellectual Property Office, Office Action issued May 4, 2017, in Application No. 105122491.
Taiwan Intellectual Property Office, Office Action issued Oct. 24, 2018, in Application No. 106140199.
Taiwan Intellectual Property Office, Office Action issued Oct. 9, 2014, in Application No. 101118860.
United States Patent and Trademark Office, Notice of Allowance mailed Apr. 15, 2021, in U.S. Appl. No. 16/503,916.
United States Patent and Trademark Office, Notice of Allowance mailed Feb. 8, 2022, in U.S. Appl. No. 16/503,916.
United States Patent and Trademark Office, Notice of Allowance mailed Jul. 12, 2022, in U.S. Appl. No. 16/787,869.
United States Patent and Trademark Office, Notice of Allowance mailed Jul. 13, 2022, in U.S. Appl. No. 16/786,372.
United States Patent and Trademark Office, Notice of Allowance mailed Jul. 6, 2022, in U.S. Appl. No. 16/503,916.
United States Patent and Trademark Office, Office Action mailed Jan. 10, 2020, in U.S. Appl. No. 16/503,916.
United States Patent and Trademark Office, Office Action mailed Sep. 10, 2021, in U.S. Appl. No. 16/786,372.
United States Patent and Trademark Office, Office Action mailed Sep. 18, 2020, in U.S. Appl. No. 16/503,916.
United States Patent and Trademark Office, Office Action mailed Sep. 10, 2021, in U.S. Appl. No. 16/787,869.
Beijing East IpP Ltd., Statement attached with a Mailing List, submitted to the State Intellectual Property Office of China on Apr. 29, 2015, and resubmitted to the State Intellectual Property Office of China on Nov. 18, 2015, requesting correction of the filing date for Chinese Patent Application No. 201210118202.7.
State Intellectual Property Office of China, Formal Letter of Examination issued Dec. 2, 2015, in Application No. 201210118202.7.
State Intellectual Property Office of China, print-out of bibliographic data from http://cpquery.sipo.gov.cn of Chinese Patent Application No. 201210118202.7, dated Feb. 25, 2016.
United States Patent and Trademark Office, Notice of Allowance mailed Apr. 29, 2024, in U.S. Appl. No. 17/857,475.
United States Patent and Trademark Office, Notice of Allowance mailed Mar. 18, 2024, in U.S. Appl. No. 17/689,860.
United States Patent and Trademark Office, Office Action mailed Mar. 22, 2024, in U.S. Appl. No. 18/229,596.
United States Patent and Trademark Office, Notice of Allowance mailed Apr. 27, 2023, in U.S. Appl. No. 17/333,844.
United States Patent and Trademark Office, Notice of Allowance mailed May 12, 2023, in U.S. Appl. No. 16/786,372.
United States Patent and Trademark Office, Notice of Allowance mailed May 5, 2023, in U.S. Appl. No. 17/152,418.
United States Patent and Trademark Office, Notice of Allowance mailed Jan. 29, 2025, in U.S. Appl. No. 18/741,647.

* cited by examiner

US 12,506,416 B2

SYSTEMS AND METHODS FOR ADJUSTING OUTPUT VOLTAGES WITH OUTPUT VOLTAGE DETECTION ON SECONDARY SIDES OF POWER CONVERTERS

1. CROSS-REFERENCES TO RELATED APPLICATIONS

This application claims priority to Chinese Patent Application No. 202110865735.0, filed Jul. 29, 2021, incorporated by reference herein for all purposes.

2. BACKGROUND OF THE INVENTION

Certain embodiments of the present invention are directed to circuits. More particularly, some embodiments of the invention provide systems and methods for adjusting output voltages with output voltage detection on secondary sides of power converters. Merely by way of example, some embodiments of the invention have been applied to flyback power converters. But it would be recognized that the invention has a much broader range of applicability.

With development of the modern electronics, the operation voltage of many electronic circuits has become lower, but the operation current of the electronic circuits has become higher. Accordingly, the overall power consumption of the electronic circuits has become more important for circuit design. In a conventional power converter, the rectification circuit on the secondary side often employs a Schottky diode, but as the operation voltage decreases, the power efficiency of the rectification circuit also decreases. To improve power efficiency, the synchronous rectification technique has been used for power converters that have low operation voltage and high operation current. Usually, the synchronous rectification technique achieves high power efficiency by replacing the Schottky diode with a power metal-oxide-semiconductor field-effect transistors (MOSFET) with low on-resistance.

FIG. 1 is a simplified diagram showing a conventional flyback power converter with synchronous rectification. As shown in FIG. 1, the flyback power converter 100 includes a primary winding 110 (e.g., $N_p$), a secondary winding 112 (e.g., $N_s$), and an auxiliary winding 2114 (e.g., $N_{aux}$), all of which are parts of a transformer (e.g., a transformer T1). On the primary side, the flyback power converter 100 also includes a bridge rectifier 120 (e.g., a rectifier that includes four diodes), a capacitor 140 (e.g., $C_{bulk}$), a transistor 150 (e.g., a power MOSFET M1), a pulse-width-modulation controller 152 (e.g., a controller chip U1), a resistor 2134, a diode 2146, a capacitor 2148, a resistor 4116 (e.g., $R_1$), a resistor 4118 (e.g., $R_2$), and a resistor 4146. The resistors 2134 and 4146, the diode 2146, and the capacitor 2148 are parts of a Resistor-Capacitor-Diode (RCD) clamp circuit. Additionally, on the secondary side, the flyback power converter 100 also includes a controller 160 for synchronous rectification (e.g., a controller chip U2), a capacitor 170 (e.g., $C_O$), a transistor 180 (e.g., a MOSFET M2), and a body diode 190 (e.g., a parasitic diode of the transistor 180).

As shown in FIG. 1, an alternating current (AC) input voltage 122 is rectified by the bridge rectifier 120 and then filtered by the capacitor 140 (e.g., $C_{bulk}$). One terminal of the capacitor 140 (e.g., $C_{bulk}$) is biased to a voltage 4120 (e.g., $V_{bulk}$) and is connected to one terminal of the primary winding 110 (e.g., $N_p$). The one terminal of the primary winding 110 (e.g., $N_p$) is connected to one terminal of the resistor 2134 and one terminal of the resistor 4146. Another terminal of the resistor 4146 is connected to one terminal of the capacitor 2148. Another terminal of the resistor 2134 and another terminal of the capacitor 2148 are connected to one terminal of the diode 2146. Another terminal of the primary winding 110 (e.g., $N_p$) is connected to another terminal of the diode 2146 and the drain terminal of the transistor 150 (e.g., a MOSFET M1). One terminal of the auxiliary winding 2114 (e.g., $N_{aux}$) is connected to one terminal of the resistor 4116 (e.g., $R_1$). Another terminal of the resistor 4116 (e.g., $R_1$) is connected to a terminal 4154 (e.g., FB) of the pulse-width-modulation controller 152 (e.g., the controller chip U1) and one terminal of the resistor 4118 (e.g., $R_2$). Another terminal of the auxiliary winding 2114 (e.g., $N_{aux}$) and another terminal of the resistor 4118 (e.g., $R_2$) are biased to the ground voltage on the primary side. Additionally, a terminal 156 (e.g., Dr) of the pulse-width-modulation controller 152 (e.g., the controller chip U1) is connected to the gate terminal of the transistor 150 (e.g., a MOSFET M1). The pulse-width-modulation controller 152 (e.g., the controller chip U1) determines the switching frequency of the flyback power converter 100 and outputs a voltage 148 through the terminal 156 (e.g., Dr) to the gate terminal of the transistor 150 (e.g., a MOSFET M1). The source terminal of the transistor 150 (e.g., a MOSFET M1) is biased to the ground voltage on the primary side.

One terminal of the secondary winding 112 (e.g., $N_s$) is connected to the cathode of the body diode 190, the drain terminal of the transistor 180 (e.g., a MOSFET M2), and a terminal 162 (e.g., $V_D$) of the controller 160 for synchronous rectification (e.g., the controller chip U2). Additionally, another terminal of the secondary winding 112 (e.g., $N_s$) is connected to one terminal of the capacitor 170 (e.g., $C_O$) and is also connected to a terminal 164 (e.g., $V_{out}$) of the controller 160 for synchronous rectification (e.g., the controller chip U2). The source terminal of the transistor 180 (e.g., a MOSFET M2) is connected to the anode of the body diode 190, and the gate terminal of the transistor 180 (e.g., a MOSFET M2) is connected to a terminal 166 (e.g., Gate) of the controller 160 for synchronous rectification (e.g., the controller chip U2). Another terminal of the capacitor 170 (e.g., $C_O$), the source terminal of the transistor 180 (e.g., a MOSFET M2), and a terminal 168 (e.g., GND) of the controller 160 for synchronous rectification (e.g., the controller chip U2) all are biased to the ground voltage on the secondary side. A terminal 4162 (e.g., $V_{cc}$) is connected to one terminal of the capacitor 4164, and another terminal of the capacitor 4164 is biased to the ground voltage on the secondary side.

The output voltage 172 (e.g., $V_O$) represents the voltage drop between the two terminals of the capacitor 170 (e.g., $C_O$). In addition to the output voltage 172 (e.g., $V_O$), the flyback power converter 100 also provides an output current 174. Moreover, a current 146 flows through the primary winding 110 (e.g., $N_p$), and a current 192 flows through the secondary winding 112 (e.g., $N_s$). The controller 160 for synchronous rectification (e.g., the controller chip U2) receives a voltage 194 through the terminal 162 (e.g., $V_D$) from the drain terminal of the transistor 180 (e.g., a MOSFET M2), receives a voltage 4170 through the terminal 164 (e.g., $V_{out}$), receives a voltage 4172 through the terminal 168 (e.g., GND), and outputs a voltage 196 through the terminal 166 (e.g., Gate) to the gate terminal of the transistor 180 (e.g., a MOSFET M2). For example, the voltage 4170 is equal to the output voltage 172 (e.g., $V_O$). As an example, the voltage 4172 is equal to the ground voltage on the secondary side.

As shown in FIG. 1, the resistor 4116 (e.g., $R_1$) and the resistor 4118 (e.g., $R_2$) are parts of a voltage divider. The voltage divider and the auxiliary winding 2114 (e.g., $N_{aux}$) are used to generate a feedback signal 4117, which represents the output voltage 172 (e.g., $V_O$) of the flyback power converter 100 during demagnetization of the transformer (e.g., the transformer T1). The transformer (e.g., the transformer T1) includes the primary winding 110 (e.g., $N_p$), the secondary winding 112 (e.g., $N_s$), and the auxiliary winding 2114 (e.g., $N_{aux}$). The feedback signal 4117 is received by the terminal 4154 (e.g., FB) of the pulse-width-modulation controller 152 (e.g., the controller chip U1), which in response regulates the output voltage 172 (e.g., $V_O$) based at least in part on the feedback signal 4117. Additionally, the controller 160 for synchronous rectification (e.g., a controller chip U2) detects the state of the secondary winding 112 (e.g., $N_s$) through the terminal 162 (e.g., $V_D$) to turn on and/or turn off the transistor 180 (e.g., a MOSFET M2).

FIG. 2 is a simplified diagram showing another conventional flyback power converter with synchronous rectification. As shown in FIG. 2, the flyback power converter 200 includes a primary winding 210 (e.g., $N_p$), a secondary winding 212 (e.g., $N_s$), and an auxiliary winding 2214, all of which are parts of a transformer (e.g., a transformer T1). On the primary side, the flyback power converter 200 also includes a bridge rectifier 220 (e.g., a rectifier that includes four diodes), a capacitor 240 (e.g., $C_{bulk}$), a transistor 250 (e.g., a power MOSFET M1), a pulse-width-modulation controller 252 (e.g., a controller chip U1), a resistor 2234, a diode 2246, a capacitor 2248, a resistor 4216 (e.g., $R_1$), a resistor 4218 (e.g., $R_2$), and a resistor 4246. The resistors 2234 and 4246, the diode 2246, and the capacitor 2248 are parts of a Resistor-Capacitor-Diode (RCD) clamp circuit. Additionally, on the secondary side, the flyback power converter 200 also includes a controller 260 for synchronous rectification (e.g., a controller chip U2), a capacitor 270 (e.g., $C_O$), a transistor 280 (e.g., a MOSFET M2), and a body diode 290 (e.g., a parasitic diode of the transistor 280).

As shown in FIG. 2, an alternating current (AC) input voltage 222 is rectified by the bridge rectifier 220 and then filtered by the capacitor 240 (e.g., $C_{bulk}$). One terminal of the capacitor 240 (e.g., $C_{bulk}$) is biased to a voltage 4220 (e.g., $V_{bulk}$) and is connected to one terminal of the primary winding 210 (e.g., $N_p$). The one terminal of the primary winding 210 (e.g., $N_p$) is connected to one terminal of the resistor 2234 and one terminal of the resistor 4246. Another terminal of the resistor 4246 is connected to one terminal of the capacitor 2248. Another terminal of the resistor 2234 and another terminal of the capacitor 2248 are connected to one terminal of the diode 2246. Another terminal of the primary winding 210 (e.g., $N_p$) is connected to another terminal of the diode 2246 and the drain terminal of the transistor 250 (e.g., a MOSFET M1). One terminal of the auxiliary winding 2214 is connected to one terminal of the resistor 4216 (e.g., $R_1$). Another terminal of the resistor 4216 (e.g., $R_1$) is connected to a terminal 4254 (e.g., FB) of the pulse-width-modulation controller 252 (e.g., the controller chip U1) and one terminal of the resistor 4218 (e.g., $R_2$). Another terminal of the auxiliary winding 2214 and another terminal of the resistor 4218 (e.g., $R_2$) are biased to the ground voltage on the primary side. Additionally, a terminal 256 (e.g., Dr) of the pulse-width-modulation controller 252 (e.g., the controller chip U1) is connected to the gate terminal of the transistor 250 (e.g., a MOSFET M1). The pulse-width-modulation controller 252 (e.g., the controller chip U1) determines the switching frequency of the flyback power converter 200 and outputs a voltage 248 through the terminal 256 (e.g., Dr) to the gate terminal of the transistor 250 (e.g., a MOSFET M1). The source terminal of the transistor 250 (e.g., a MOSFET M1) is biased to the ground voltage on the primary side.

One terminal of the secondary winding 212 (e.g., $N_s$) is biased to a voltage 4268 and is connected to the anode of the body diode 290, the source terminal of the transistor 280 (e.g., a MOSFET M2), and a terminal 268 (e.g., GND) of the controller 260 for synchronous rectification (e.g., the controller chip U2). Additionally, another terminal of the secondary winding 212 (e.g., $N_s$) is biased to the ground voltage on the secondary side. The gate terminal of the transistor 280 (e.g., a MOSFET M2) is connected to a terminal 266 (e.g., Gate) of the controller 260 for synchronous rectification (e.g., the controller chip U2). The drain terminal of the transistor 280 (e.g., a MOSFET M2) is connected to the cathode of the body diode 290, a terminal 262 (e.g., $V_D$) of the controller 260 for synchronous rectification (e.g., the controller chip U2), and one terminal of the capacitor 270 (e.g., $C_O$). Another terminal of the capacitor 270 (e.g., $C_O$) is biased to the ground voltage on the secondary side.

A terminal 4262 (e.g., $V_{cc}$) is connected to one terminal of the capacitor 4264, and another terminal of the capacitor 4264 is biased to the voltage 4268 and is connected to the terminal 268 (e.g., GND) of the controller 260 for synchronous rectification (e.g., the controller chip U2). The output voltage 272 (e.g., $V_O$) represents the voltage drop between the two terminals of the capacitor 270 (e.g., $C_O$). In addition to the output voltage 272 (e.g., $V_O$), the flyback power converter 200 also provides an output current 274. A terminal 264 (e.g., $V_{out}$) of the controller 260 for synchronous rectification (e.g., the controller chip U2) is not biased (e.g., floating electrically).

Moreover, a current 246 flows through the primary winding 210, and a current 292 flows through the secondary winding 212 (e.g., $N_s$). The controller 260 for synchronous rectification (e.g., the controller chip U2) receives a voltage 294 through the terminal 262 (e.g., $V_D$) from the drain terminal of the transistor 280 (e.g., a MOSFET M2), and outputs a voltage 296 through the terminal 266 (e.g., Gate) to the gate terminal of the transistor 280 (e.g., a MOSFET M2). For example, the voltage 294 with respect to the ground voltage on the secondary side is equal to the output voltage 272 (e.g., $V_O$).

As shown in FIG. 2, the resistor 4216 (e.g., $R_1$) and the resistor 4218 (e.g., $R_2$) are parts of a voltage divider. The voltage divider and the auxiliary winding 2214 (e.g., $N_{aux}$) are used to generate a feedback signal 4217, which represents the output voltage 272 (e.g., $V_O$) of the flyback power converter 200 during demagnetization of the transformer (e.g., the transformer T1). The transformer (e.g., the transformer T1) includes the primary winding 210 (e.g., $N_p$), the secondary winding 212 (e.g., $N_s$), and the auxiliary winding 2214 (e.g., $N_{aux}$). The feedback signal 4217 is received by the terminal 4254 (e.g., FB) of the pulse-width-modulation controller 252 (e.g., the controller chip U1), which in response regulates the output voltage 272 (e.g., $V_O$) based at least in part on the feedback signal 4217. Additionally, the controller 260 for synchronous rectification (e.g., a controller chip U2) detects the state of the secondary winding 212 (e.g., $N_s$) through the terminal 262 (e.g., $V_D$) to turn on and/or turn off the transistor 280 (e.g., a MOSFET M2).

Hence it is highly desirable to improve the technique for regulating an output voltage of a power converter.

3. BRIEF SUMMARY OF THE INVENTION

Certain embodiments of the present invention are directed to circuits. More particularly, some embodiments of the invention provide systems and methods for adjusting output voltages with output voltage detection on secondary sides of power converters. Merely by way of example, some embodiments of the invention have been applied to flyback power converters. But it would be recognized that the invention has a much broader range of applicability.

According to some embodiments, a system for controlling synchronous rectification, the system comprising: a first controller terminal configured to receive a first voltage; and a second controller terminal biased to a second voltage; wherein the system is further configured to: if a voltage difference from the first controller terminal to the second controller terminal satisfies one or more first conditions, generate a first current to flow through the first controller terminal; and if the voltage difference from the first controller terminal to the second controller terminal satisfies one or more second conditions, generate a second current to flow through the second controller terminal; wherein: the voltage difference from the first controller terminal to the second controller terminal is equal to the first voltage minus the second voltage; the one or more first conditions and the one or more second conditions are different; and the second current includes one or more current pulses.

According to certain embodiments, a system for controlling synchronous rectification includes: a first controller terminal configured to receive a first voltage; a second controller terminal biased to a second voltage; and a third controller terminal different from the first controller terminal and the second controller terminal; wherein the system is further configured to: if a voltage difference from the first controller terminal to the second controller terminal satisfies one or more first conditions, generate a first current to flow through the first controller terminal; and if the voltage difference from the first controller terminal to the second controller terminal satisfies one or more second conditions, generate a second current to flow through the third controller terminal; wherein: the voltage difference from the first controller terminal to the second controller terminal is equal to the first voltage minus the second voltage; the one or more first conditions and the one or more second conditions are different; and the second current includes one or more current pulses.

According to some embodiments, a method for controlling synchronous rectification includes: receiving a first voltage at a first controller terminal; receiving a second voltage at a second controller terminal; if a voltage difference from the first controller terminal to the second controller terminal satisfies one or more first conditions, generating a first current to flow through the first controller terminal; and if the voltage difference from the first controller terminal to the second controller terminal satisfies one or more second conditions, generating a second current to flow through the second controller terminal; wherein: the voltage difference from the first controller terminal to the second controller terminal is equal to the first voltage minus the second voltage; the one or more first conditions and the one or more second conditions are different; and the second current includes one or more current pulses.

According to certain embodiments, a method for controlling synchronous rectification includes: receiving a first voltage at a first controller terminal; receiving a second voltage at a second controller terminal; if a voltage difference from the first controller terminal to the second controller terminal satisfies one or more first conditions, generating a first current to flow through the first controller terminal; and if the voltage difference from the first controller terminal to the second controller terminal satisfies one or more second conditions, generating a second current to flow through a third controller terminal, the third controller terminal being different from the first controller terminal and the second controller terminal; wherein: the voltage difference from the first controller terminal to the second controller terminal is equal to the first voltage minus the second voltage; the one or more first conditions and the one or more second conditions are different; and the second current includes one or more current pulses.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for adjusting output voltages with output voltage detection on secondary sides of power converters. Merely by way of example, some embodiments of the invention have been applied to flyback power converters. But it would be recognized that the invention has a much broader range of applicability.

Figure 1:
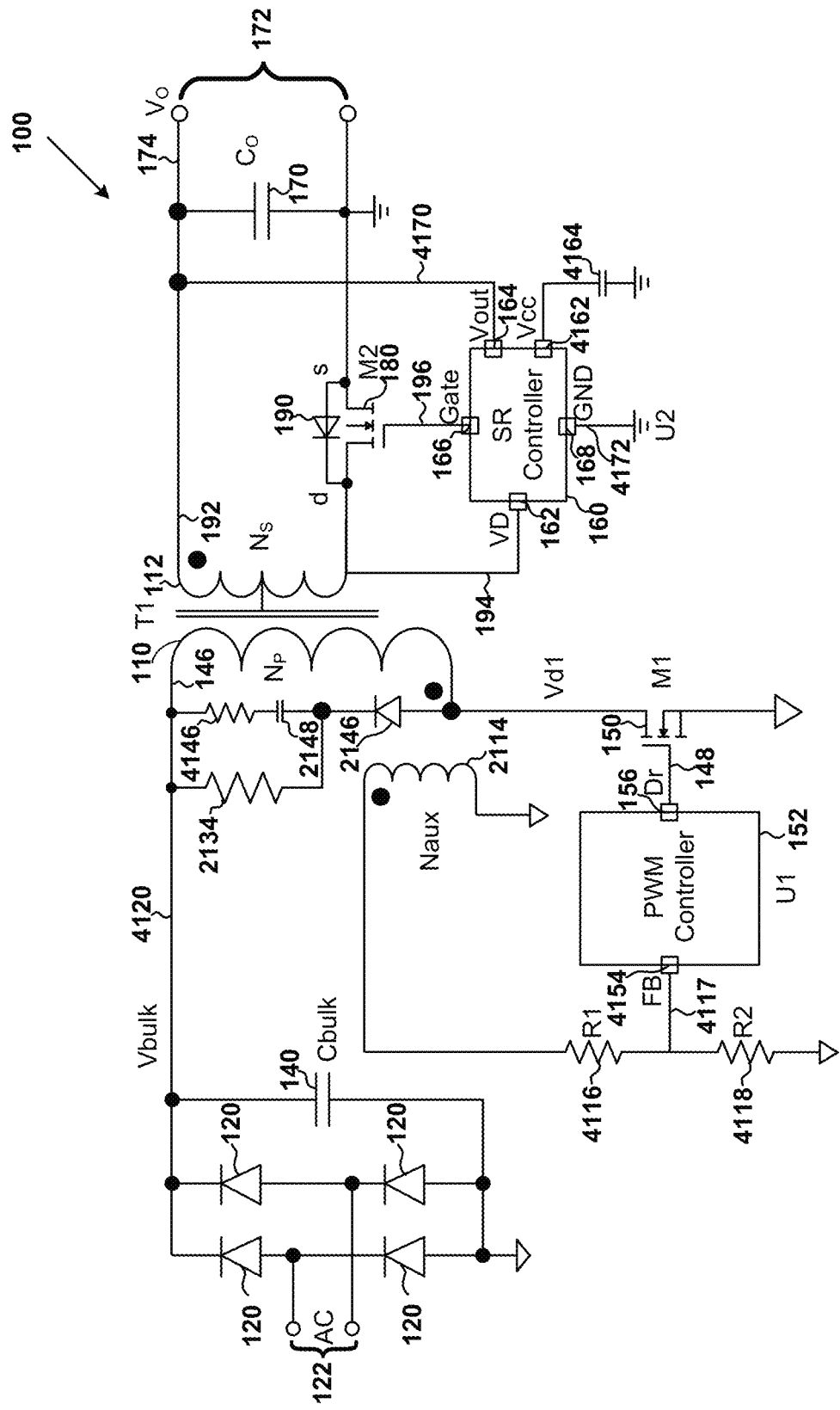
FIG. 1 is a simplified diagram showing a conventional flyback power converter with synchronous rectification.
Figure 2:
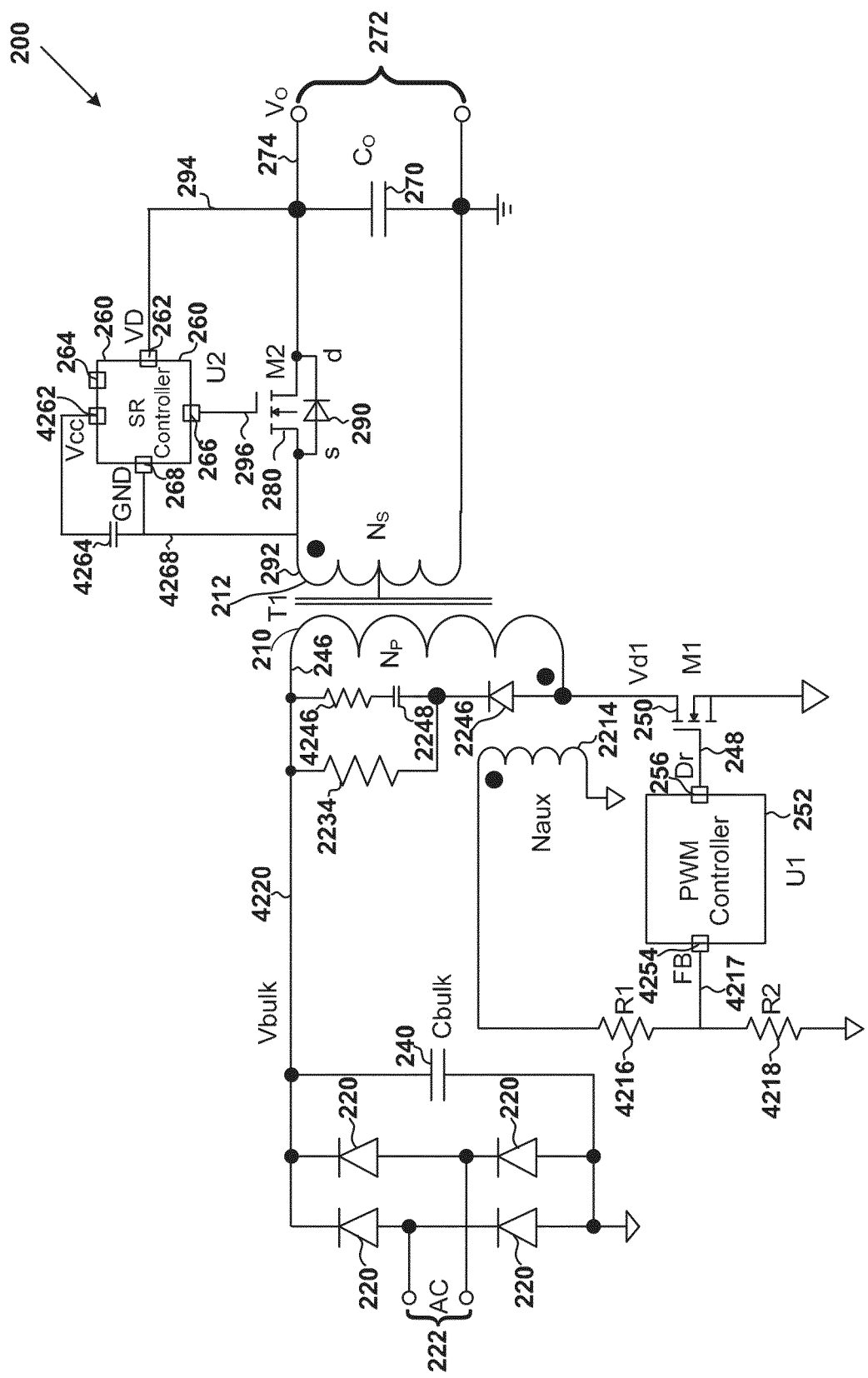
FIG. 2 is a simplified diagram showing another conventional flyback power converter with synchronous rectification.

As shown in FIG. 1 and/or FIG. 2, the dynamic response of a switching power supply system (e.g., the flyback power converter 100 and/or the flyback power converter 200) represents the ability of the switching power supply system to regulate its system output voltage (e.g., the output voltage 172 and/or the output voltage 272) when the system load (e.g., the output current 174 and/or the output current 274) changes according to some embodiments. In certain examples, for the flyback power converter 100, if the system load is at no load, the output current 174 is equal to zero, and if the system load is at full load, the output current 174 is equal to a predetermined maximum. In some examples, for the flyback power converter 200, if the system load is at no load, the output current 274 is equal to zero, and if the system load is at full load, the output current 274 is equal to a predetermined maximum.

For example, when the system load (e.g., the output current 174 and/or the output current 274) increases, the system output voltage (e.g., the output voltage 172 and/or the output voltage 272) tends to decrease, and the system operating frequency (e.g., the switching frequency of the flyback power converter 100 and/or the switching frequency of the flyback power converter 200) tends to increase. As an example, when the system load (e.g., the output current 174 and/or the output current 274) decreases, the system output voltage (e.g., the output voltage 172 and/or the output voltage 272) tends to increase, and the system operating frequency (e.g., the switching frequency of the flyback power converter 100 and/or the switching frequency of the flyback power converter 200) tends to decrease.

According to certain embodiments, the pulse-width-modulation controller 152 and/or the pulse-width-modulation controller 252 detects the output voltage 172 and/or the output voltage 272 during demagnetization of the transformer of the flyback power converter 100 and/or demagnetization of the transformer of the flyback power converter 200. For example, the detection of the change in the output voltage 172 during demagnetization and/or the detection of the change in the output voltage 272 during demagnetization is closely related to the change in the output current 174 and/or the change in the output current 274. As an example, the timing of the detection of the change in the output voltage 172 and/or the timing of the detection of the change in the output voltage 272 has a significant impact on the dynamic response of the flyback power converter 100 and/or the dynamic response of the flyback power converter 200.

In some embodiments, if the change in the output current 174 and/or the change in the output current 274 occurs during demagnetization of the transformer of the flyback power converter 100 and/or demagnetization of the transformer of the flyback power converter 200, the pulse-width-modulation controller 152 and/or the pulse-width-modulation controller 252 can quickly detect the change in the output voltage 172 and/or the change in the output voltage 272 and provide satisfactory dynamic response for the flyback power converter 100 and/or the flyback power converter 200.

In certain embodiments, if the change in the output current 174 and/or the change in the output current 274 occurs not during demagnetization (e.g., occurs after demagnetization) of the transformer of the flyback power converter 100 and/or demagnetization of the transformer of the flyback power converter 200, the dynamic response for the flyback power converter 100 and/or the flyback power converter 200 can become unsatisfactory because the pulse-width-modulation controller 152 and/or the pulse-width-modulation controller 252 can detect the change in the output voltage 172 and/or the change in the output voltage 272 only during demagnetization of the transformer of the flyback power converter 100 and/or demagnetization of the transformer of the flyback power converter 200. For example, if the output current 174 and/or the output current 274 change from zero to a predetermined maximum and/or change from the predetermined maximum to zero immediately after demagnetization has ended in the current switching cycle of the flyback power converter 100 and/or of the flyback power converter 200, the pulse-width-modulation controller 152 and/or the pulse-width-modulation controller 252 cannot timely detect the change in the output voltage 172 and/or the change in the output voltage 272, because the pulse-width-modulation controller 152 and/or the pulse-width-modulation controller 252 cannot detect the change in the output voltage 172 and/or the change in the output voltage 272 until the beginning of demagnetization in the next switching cycle of the flyback power converter 100 and/or of the flyback power converter 200. As an example, the degradation of the dynamic response for the flyback power converter 100 and/or the flyback power converter 200 is especially serious if the output current 174 and/or the output current 274 change from zero to the predetermined maximum immediately after demagnetization has ended in the current switching cycle of the flyback power converter 100 and/or of the flyback power converter 200.

Figure 3:
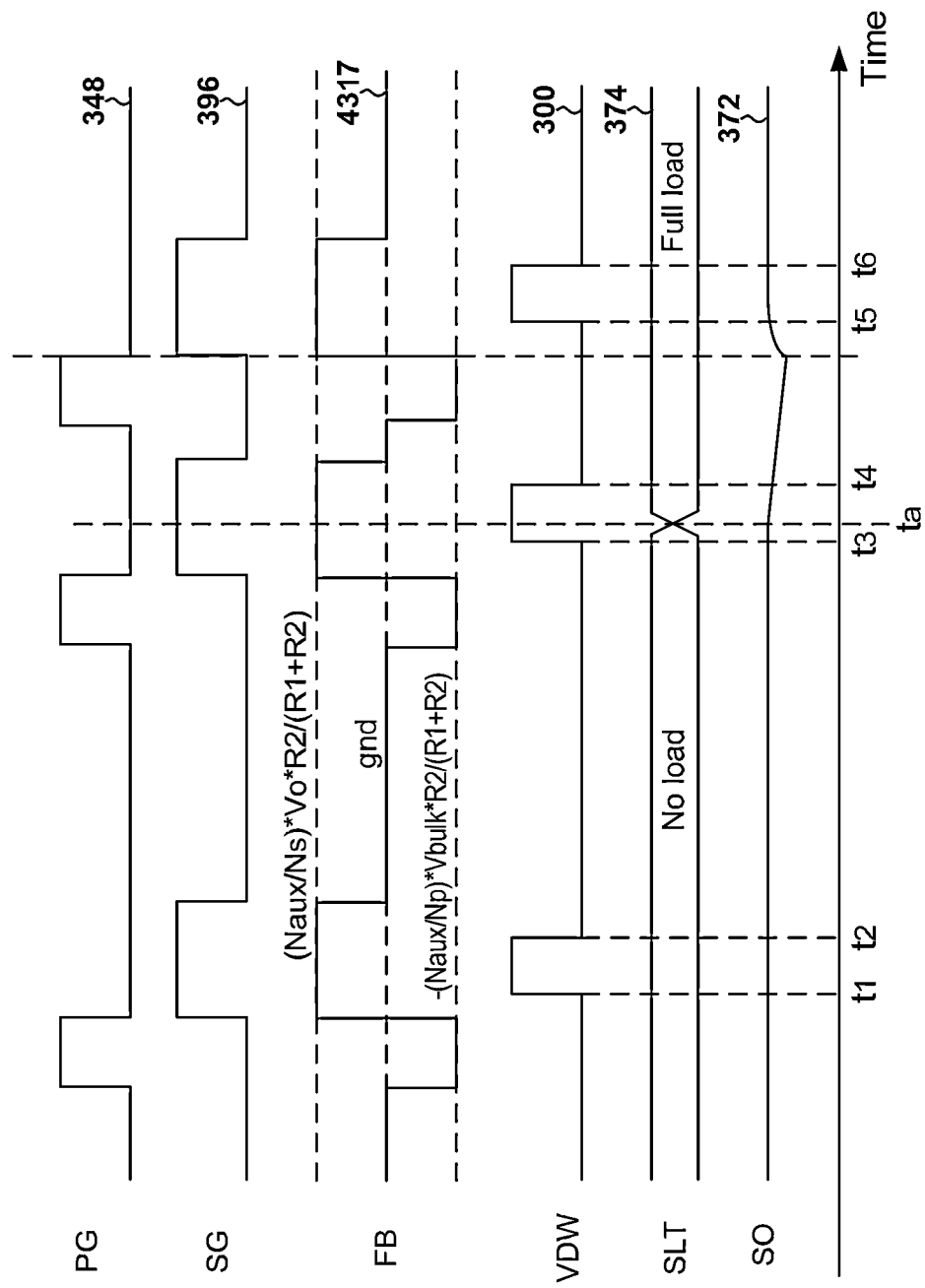
FIG. 3 shows simplified timing diagrams related to dynamic response when system load changes from no load to full load during demagnetization for the flyback power converter as shown in FIG. 1 and/or the flyback power converter as shown in FIG. 2 according to some embodiments.

FIG. 3 shows simplified timing diagrams related to dynamic response when system load changes from no load to full load during demagnetization for the flyback power converter 100 as shown in FIG. 1 and/or the flyback power converter 200 as shown in FIG. 2 according to some embodiments. In certain examples, the simplified timing diagrams are related to dynamic response when system load changes from no load to full load during demagnetization for the flyback power converter 100 as shown in FIG. 1, wherein the waveform 348 represents the voltage 148 as a function of time, the waveform 396 represents the voltage 196 as a function of time, the waveform 4317 represents the feedback signal 4117 as a function of time, the waveform 300 represents one or more voltage detection windows during magnetization by the pulse-width-modulation controller 152 as a function of time, the waveform 374 represents the system load (e.g., the output current 274) of the flyback power converter 100 as a function of time, and the waveform 372 represents the output voltage 172 as a function of time. In some examples, the simplified timing diagrams are related to dynamic response when system load changes from no load to full load during demagnetization for the flyback power converter 200 as shown in FIG. 2, wherein the waveform 348 represents the voltage 248 as a function of time, the waveform 396 represents the voltage 296 as a function of time, the waveform 4317 represents the feedback signal 4217 as a function of time, the waveform 300 represents one or more voltage detection windows during magnetization by the pulse-width-modulation controller 252 as a function of time, the waveform 374 represents the system load (e.g., the output current 274) of the flyback power converter 200 as a function of time, and the waveform 372 represents the output voltage 272 as a function of time.

For example, the waveform 4317 represents the feedback signal 4117 and/or the feedback signal 4217 as a function of time, ignoring signal resonance during magnetization for the flyback power converter 100 as shown in FIG. 1 and/or the flyback power converter 200. As an example, the waveform 300 shows that the pulse-width-modulation controller 152 and/or the pulse-width-modulation controller 252 detects the output voltage 172 and/or the output voltage 272 through the feedback signal 4117 and/or the feedback signal 4217 from time $t_1$ to time $t_2$, from time $t_3$ to time $t_4$, and from time $t_5$ to time $t_6$ during demagnetization of the flyback power converter 100 and/or the flyback power converter 200. For example, the waveform 374 shows the system load of the flyback power converter 100 and/or the system load of the flyback power converter 200 changes from no load to full load at time $t_a$, wherein time $t_a$ falls within the voltage detection window between time $t_3$ and time $t_4$.

Figure 4:
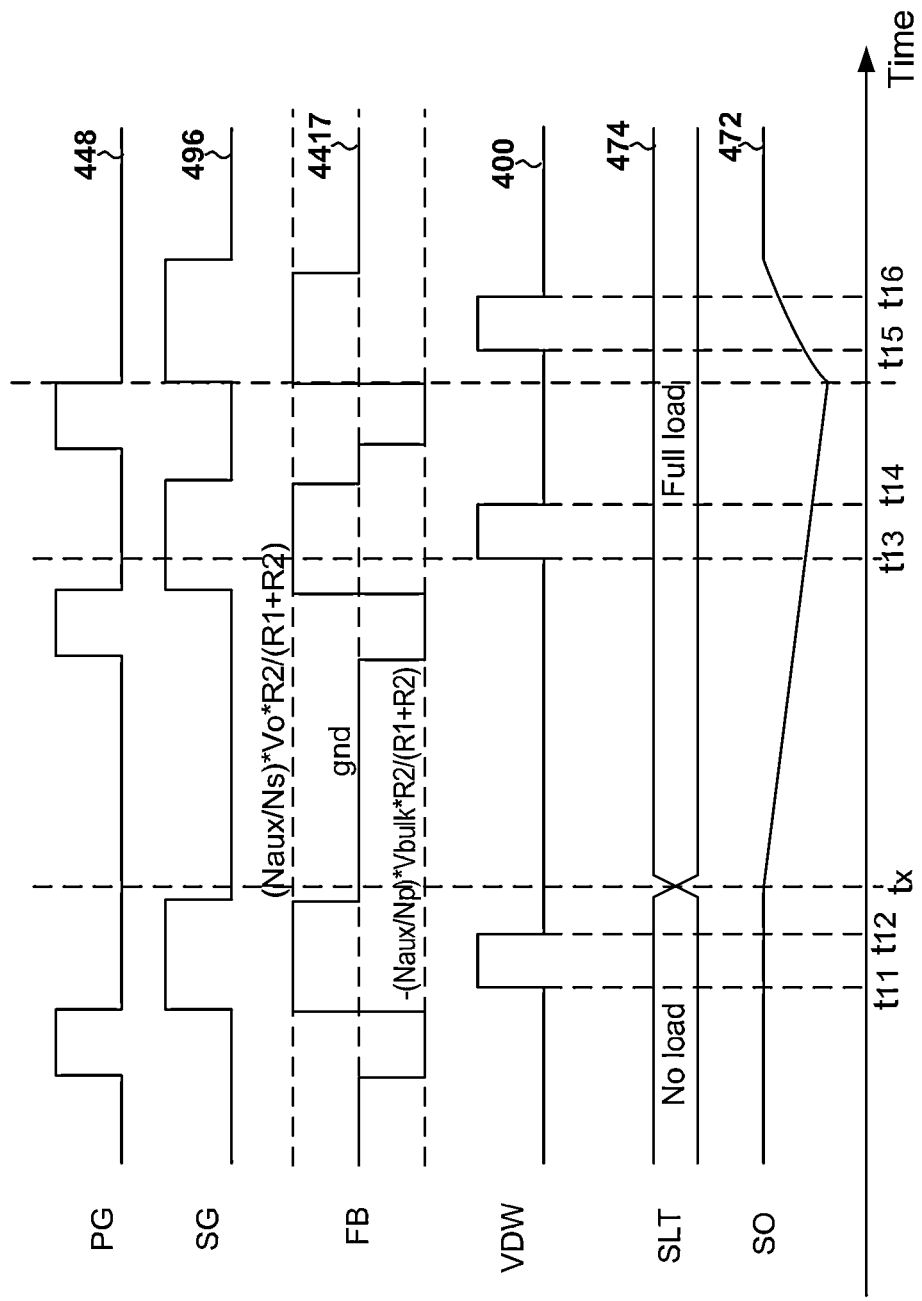
FIG. 4 shows simplified timing diagrams related to dynamic response when system load changes from no load to full load after demagnetization for the flyback power converter as shown in FIG. 1 and/or the flyback power converter as shown in FIG. 2 according to certain embodiments.

FIG. 4 shows simplified timing diagrams related to dynamic response when system load changes from no load to full load after demagnetization for the flyback power converter 100 as shown in FIG. 1 and/or the flyback power converter 200 as shown in FIG. 2 according to certain embodiments. In some examples, the simplified timing diagrams are related to dynamic response when system load changes from no load to full load after demagnetization for the flyback power converter 100 as shown in FIG. 1, wherein the waveform 448 represents the voltage 148 as a function of time, the waveform 496 represents the voltage 196 as a function of time, the waveform 4417 represents the feedback signal 4117 as a function of time, the waveform 400 represents one or more voltage detection windows during magnetization by the pulse-width-modulation controller 152 as a function of time, the waveform 474 represents the system load (e.g., the output current 274) of the flyback power converter 100 as a function of time, and the waveform 472 represents the output voltage 172 as a function of time. In some examples, the simplified timing diagrams are related to dynamic response when system load changes from no load to full load after demagnetization for the flyback power converter 200 as shown in FIG. 2, wherein the waveform 448 represents the voltage 248 as a function of time, the waveform 496 represents the voltage 296 as a function of time, the waveform 4417 represents the feedback signal 4217 as a function of time, the waveform 400 represents one or more voltage detection windows during magnetization by the pulse-width-modulation controller 252 as a function of time, the waveform 474 represents the system load (e.g., the output current 274) of the flyback power converter 200 as a function of time, and the waveform 472 represents the output voltage 272 as a function of time.

For example, the waveform 4417 represents the feedback signal 4117 and/or the feedback signal 4217 as a function of time, ignoring signal resonance during magnetization for the flyback power converter 100 as shown in FIG. 1 and/or the flyback power converter 200. As an example, the waveform 400 shows that the pulse-width-modulation controller 152 and/or the pulse-width-modulation controller 252 detects the output voltage 172 and/or the output voltage 272 through the feedback signal 4117 and/or the feedback signal 4217 from time $t_{11}$ to time $t_{12}$, from time $t_{13}$ to time $t_{14}$, and from time $t_{15}$ to time $t_{16}$ during demagnetization of the flyback power converter 100 and/or the flyback power converter 200. For example, the waveform 474 shows the system load of the flyback power converter 100 and/or the system load of the flyback power converter 200 changes from no load to full load at time $t_x$, wherein time $t_a$ falls outside all the voltage detection windows between time $t_{11}$ and time $t_{12}$, between time $t_{13}$ and time $t_{14}$, and between time $t_{15}$ and time $t_{16}$.

As shown in FIG. 4, the flyback power converter 100 and/or the flyback power converter 200 work in the no-load state before the system load changes at time $t_x$ so the switching frequency of the flyback power converter 100 and/or the switching frequency of the flyback power converter 200 is relatively low according to some embodiments. As an example, with low switching frequency, if the system load changes from no load to full load not during demagnetization (e.g., changes from no load to full load after demagnetization), it takes a long time for the pulse-width-modulation controller 152 and/or the pulse-width-modulation controller 252 to detect the change in the output voltage 172 and/or the change in the output voltage 272, causing an excessive drop of the output voltage 172 and/or the output voltage 272 and also causing significant degradation of the dynamic response of the flyback power converter 100 and/or the flyback power converter 200.

As shown in FIG. 1, the terminal 164 (e.g., $V_{out}$) of the controller 160 for synchronous rectification (e.g., the controller chip U2) is connected to one terminal of the capacitor 170 (e.g., $C_O$), and the terminal 168 (e.g., GND) of the controller 160 for synchronous rectification (e.g., the controller chip U2) and another terminal of the capacitor 170 (e.g., $C_O$) both are biased to the ground voltage on the secondary side according to certain embodiments. For example, the output voltage 172 (e.g., $V_O$) represents the voltage drop between the two terminals of the capacitor 170 (e.g., $C_O$). In some examples, a voltage difference from the terminal 164 (e.g., $V_{out}$) of the controller 160 to the terminal 168 (e.g., GND) of the controller 160 is equal to the output voltage 172 (e.g., $V_O$). For example, the voltage difference from the terminal 164 (e.g., $V_{out}$) of the controller 160 to the terminal 168 (e.g., GND) of the controller 160 is equal to the voltage 4170 at the terminal 164 (e.g., $V_{out}$) minus the voltage 4172 at the terminal 168 (e.g., GND).

According to FIG. 2, the terminal 262 (e.g., $V_D$) of the controller 260 for synchronous rectification (e.g., the controller chip U2) is connected to one terminal of the capacitor 270 (e.g., $C_O$), and another terminal of the capacitor 270 (e.g., $C_O$) is biased to the ground voltage on the secondary side according to some embodiments. In certain examples, the terminal 268 (e.g., GND) of the controller 260 for synchronous rectification (e.g., the controller chip U2) is connected to one terminal of the secondary winding 212 (e.g., $N_s$), and the terminal 268 (e.g., GND) of the controller 260 for synchronous rectification (e.g., the controller chip U2) is biased to the voltage 4268 that changes its magnitude during operation of the flyback power converter 200. For example, when the transistor 250 (e.g., a power MOSFET M1) is turned on, the voltage 4268 of the terminal 268 (e.g., GND) is equal to $-V_{bulk} \times N_s/N_p$ with respect to the ground voltage on the secondary side, wherein $V_{bulk}$ represents the voltage 4220, $N_p$ represents the number of turns for the primary winding 210, and $N_s$ represents the number of turns for the secondary winding 212.

In some examples, after the transistor 250 (e.g., a power MOSFET M1) is turned off, the transformer (e.g., a transformer T1) of the flyback power converter 200 enters demagnetization and the transistor 280 (e.g., a MOSFET M2) is turned on, causing the voltage 4268 of the terminal 268 (e.g., GND) to be equal to $V_O + V_{ds}$ with respect to the ground voltage on the secondary side, wherein $V_O$ represents the output voltage 272, and $V_{ds}$ represents a voltage difference from the drain terminal to the source terminal of the transistor 280 (e.g., a MOSFET M2) when the transistor 280 (e.g., a MOSFET M2) is turned on. For example, the voltage difference from the drain terminal to the source terminal of the transistor 280 (e.g., a MOSFET M2) is equal to the drain voltage at the drain terminal minus the source voltage at the source terminal of the transistor 280 (e.g., a MOSFET M2). As an example, $V_{ds} = I_{sec} \times R_{dson}$, wherein $V_{ds}$ represents the voltage difference from the drain terminal to the source terminal of the transistor 280 (e.g., a MOSFET M2) when the transistor 280 (e.g., a MOSFET M2) is turned on, $I_{sec}$ represents the current 292 that flows through the secondary winding 212, and Rayon represents the on resistance of the transistor 280 (e.g., a MOSFET M2). For example, after the transistor 250 (e.g., a power MOSFET M1) is turned off, the transformer (e.g., a transformer T1) of the flyback power converter 200 enters demagnetization and the transistor 280 (e.g., a MOSFET M2) is turned on, causing the terminal 268 (e.g., GND) of the controller 260 for synchronous rectification (e.g., the controller chip U2) to be biased to a voltage that is equal to $V_O + I_{sec} \times R_{dson}$ with respect to the ground voltage on the secondary side, wherein $V_O$ represents the output voltage 272, $I_{sec}$ represents the current 292 that flows through the secondary winding 212, and $R_{dson}$ represents the on resistance of the transistor 280 (e.g., a MOSFET M2).

In certain embodiments, after the demagnetization of the transformer (e.g., a transformer T1) of the flyback power converter 200 has ended, the transistor 280 (e.g., a MOSFET M2) is turned off and the voltage 4268 undergoes resonance around the ground voltage on the secondary side with an initial amplitude equal to the output voltage 272 (e.g., $V_O$). As an example, the resonance becomes attenuated with time, and the amplitude gradually becomes zero.

In some embodiments, after the amplitude of the resonance becomes zero, the voltage 4268 of the terminal 268 (e.g., GND) is the same as the ground voltage on the secondary side. In certain examples, the terminal 262 (e.g., $V_D$) of the controller 260 for synchronous rectification (e.g., the controller chip U2) is connected to one terminal of the capacitor 270 (e.g., $C_O$), and another terminal of the capacitor 270 (e.g., $C_O$) is biased to the ground voltage on the secondary side. For example, the output voltage 272 (e.g., $V_O$) represents the voltage drop between the two terminals of the capacitor 270 (e.g., $C_O$). In some examples, after the amplitude of the resonance becomes zero, a voltage difference from the terminal 262 (e.g., $V_D$) of the controller 260 to the terminal 268 (e.g., GND) of the controller 260 is equal to the output voltage 272 (e.g., $V_O$). For example, the voltage difference from the terminal 262 (e.g., $V_D$) of the controller 260 to the terminal 268 (e.g., GND) of the controller 260 is equal to the voltage 294 at the terminal 262 (e.g., $V_D$) minus the voltage 4268 at the terminal 268 (e.g., GND).

Figure 5:
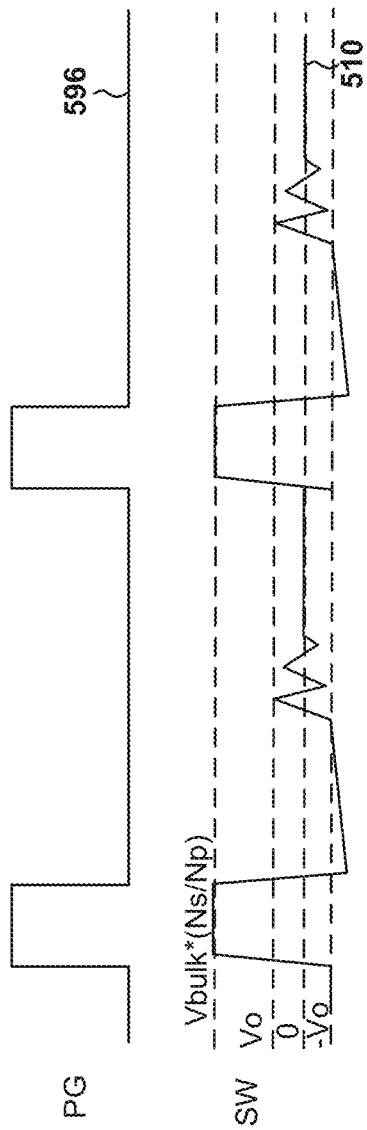
FIG. 5 shows simplified timing diagrams for the flyback power converter as shown in FIG. 2 according to some embodiments.

FIG. 5 shows simplified timing diagrams for the flyback power converter 200 as shown in FIG. 2 according to some embodiments. The waveform 596 represents the voltage 248 as a function of time, and the waveform 510 represents the ground voltage on the secondary side minus the voltage 4268 as a function of time. For example, the terminal 268 (e.g., GND) of the controller 260 for synchronous rectification (e.g., the controller chip U2) is biased at the voltage 4268.

Figure 6:
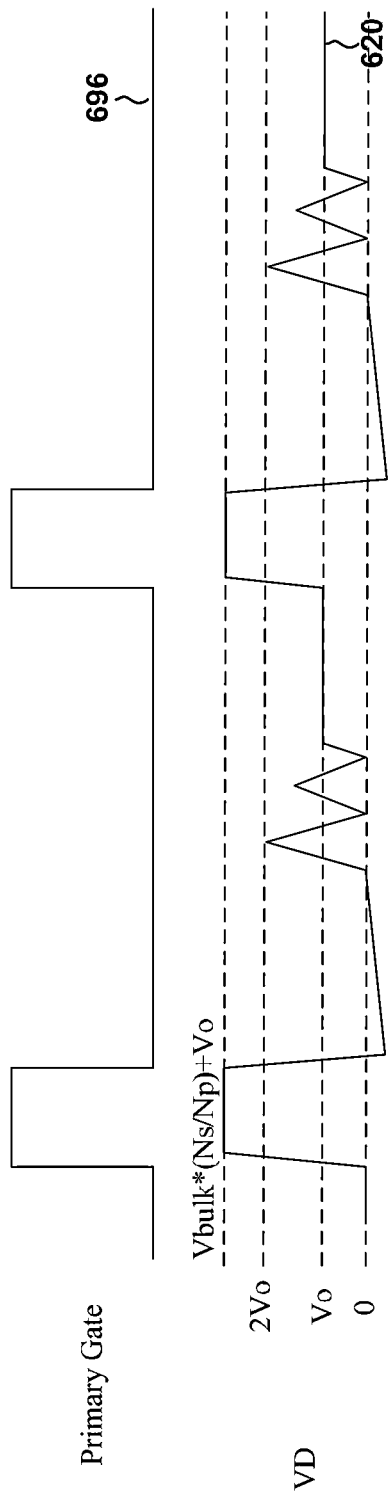
FIG. 6 shows simplified timing diagrams for the flyback power converter as shown in FIG. 2 according to certain embodiments.

FIG. 6 shows simplified timing diagrams for the flyback power converter 200 as shown in FIG. 2 according to certain embodiments. The waveform 696 represents the voltage 248 as a function of time, and the waveform 620 represents the voltage 294 minus the voltage 4268 as a function of time. For example, the terminal 262 (e.g., $V_D$) of the controller 260 for synchronous rectification (e.g., the controller chip U2) is biased to the voltage 294. As an example, the terminal 268 (e.g., GND) of the controller 260 for synchronous rectification (e.g., the controller chip U2) is biased at the voltage 4268.

As shown in FIG. 6, when the voltage 248 is at a logic high level, the voltage 294 minus the voltage 4268 is equal to $V_{bulk} \times N_S/N_p + V_O$, wherein $V_{bulk}$ represents the voltage 4220, $N_p$ represents the number of turns for the primary winding 210, $N_s$ represents the number of turns for the secondary winding 212, and $V_O$ represents the output voltage 272 according to some embodiments. In certain examples, after the voltage 248 changes from the logic high level to a logic low level, the transformer (e.g., a transformer T1) of the flyback power converter 200 enters demagnetization and the transistor 280 (e.g., a MOSFET M2) is turned on, causing the voltage 294 minus the voltage 4268 to be equal to $-I_{sec} \times R_{dson}$, wherein $I_{sec}$ represents the current 292 that flows through the secondary winding 212, and $R_{dson}$ represents the on resistance of the transistor 280 (e.g., a MOSFET M2). In some examples, after the demagnetization of the transformer (e.g., a transformer T1) of the flyback power converter 200 has ended, the transistor 280 (e.g., a MOSFET M2) is turned off and the voltage 294 minus the voltage 4268 undergoes resonance around the output voltage 272 (e.g., $V_O$) with an initial amplitude equal to the output voltage 272 (e.g., $V_O$). For example, the resonance becomes attenuated with time, and the amplitude gradually becomes zero. As an example, after the amplitude of the resonance becomes zero, the voltage 294 minus the voltage 4268 becomes constant and equal to the output voltage 272 (e.g., $V_O$).

Figure 7:
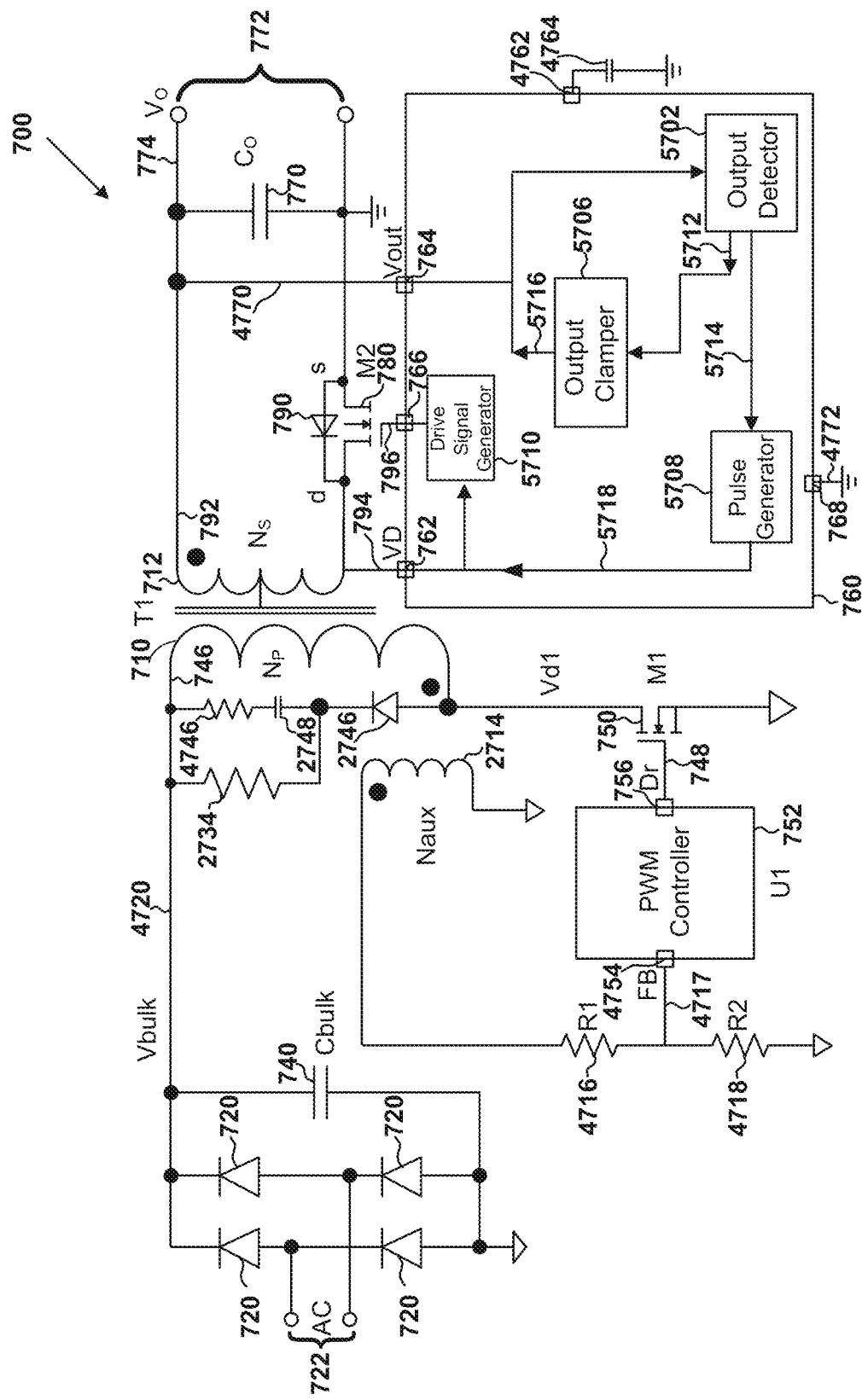
FIG. 7 is a simplified diagram showing a flyback power converter with synchronous rectification according to certain embodiments of the present invention.

FIG. 7 is a simplified diagram showing a flyback power converter with synchronous rectification according to certain embodiments of the present invention. This diagram is merely an example, which should not unduly limit the scope of the claims. One of ordinary skill in the art would recognize many variations, alternatives, and modifications. As shown in FIG. 1, the flyback power converter 700 includes a primary winding 710 (e.g., $N_p$), a secondary winding 712 (e.g., $N_s$), and an auxiliary winding 2714 (e.g., $N_{aux}$), all of which are parts of a transformer (e.g., a transformer T1). On the primary side, the flyback power converter 700 also includes a bridge rectifier 720 (e.g., a rectifier that includes four diodes), a capacitor 740 (e.g., $C_{bulk}$), a transistor 750 (e.g., a power MOSFET M1), a pulse-width-modulation controller 752 (e.g., a controller chip U1), a resistor 2734, a diode 2746, a capacitor 2748, a resistor 4716 (e.g., $R_1$), a resistor 4718 (e.g., $R_2$), and a resistor 4746. For example, the resistors 2734 and 4746, the diode 2746, and the capacitor 2748 are parts of a Resistor-Capacitor-Diode (RCD) clamp circuit. Additionally, on the secondary side, the flyback power converter 700 also includes a controller 760 for synchronous rectification (e.g., a controller chip U2), a capacitor 770 (e.g., $C_O$), a transistor 780 (e.g., a MOSFET M2), and a body diode 790 (e.g., a parasitic diode of the transistor 780). For example, the controller 760 for synchronous rectification (e.g., a controller chip U2) includes a terminal 762 (e.g., $V_D$), a terminal 764 (e.g., $V_{out}$), a terminal 766 (e.g., Gate), a terminal 768 (e.g., GND), and a terminal 4762 (e.g., $V_{cc}$). As an example, the controller 760 for synchronous rectification (e.g., a controller chip U2) also includes an output detector 5702, an output damper 5706, a pulse generator 5708, and a drive signal generator 5710. Although the above has been shown using a selected group of components for the flyback power converter 700, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 7, an alternating current (AC) input voltage 722 is rectified by the bridge rectifier 720 and then filtered by the capacitor 740 (e.g., $C_{bulk}$) according to some embodiments. In certain examples, one terminal of the capacitor 740 (e.g., $C_{bulk}$) is biased to a voltage 4720 (e.g., $V_{bulk}$) and is connected to one terminal of the primary winding 710 (e.g., $N_p$). For example, the one terminal of the primary winding 710 (e.g., $N_p$) is connected to one terminal of the resistor 2734 and one terminal of the resistor 4746. As an example, another terminal of the resistor 4746 is connected to one terminal of the capacitor 2748. In some examples, another terminal of the resistor 2734 and another terminal of the capacitor 2748 are connected to one terminal of the diode 2746. For example, another terminal of the primary winding 710 (e.g., $N_p$) is connected to another terminal of the diode 2746 and the drain terminal of the transistor 750 (e.g., a MOSFET M1). As an example, one terminal of the auxiliary winding 2714 (e.g., $N_{aux}$) is connected to one terminal of the resistor 4716 (e.g., $R_1$). In certain examples, another terminal of the resistor 4716 (e.g., $R_1$) is connected to a terminal 4754 (e.g., FB) of the pulse-width-modulation controller 752 (e.g., the controller chip U1) and one terminal of the resistor 4718 (e.g., $R_2$). For example, another terminal of the auxiliary winding 2714 (e.g., $N_{aux}$) and another terminal of the resistor 4718 (e.g., $R_2$) are biased to the ground voltage on the primary side. As an example, a terminal 756 (e.g., Dr) of the pulse-width-modulation controller 752 (e.g., the controller chip U1) is connected to the gate terminal of the transistor 750 (e.g., a MOSFET M1). In some examples, the pulse-width-modulation controller 752 (e.g., the controller chip U1) determines the switching frequency of the flyback power converter 700 and outputs a voltage 748 through the terminal 756 (e.g., Dr) to the gate terminal of the transistor 750 (e.g., a MOSFET M1). For example, the source terminal of the transistor 750 (e.g., a MOSFET M1) is biased to the ground voltage on the primary side.

In certain embodiments, one terminal of the secondary winding 712 (e.g., $N_s$) is connected to the cathode of the body diode 790, the drain terminal of the transistor 780 (e.g., a MOSFET M2), and the terminal 762 (e.g., $V_D$) of the controller 760 for synchronous rectification (e.g., the controller chip U2). In some examples, another terminal of the secondary winding 712 (e.g., $N_s$) is connected to one terminal of the capacitor 770 (e.g., $C_O$) and is also connected to the terminal 764 (e.g., $V_{out}$) of the controller 760 for synchronous rectification (e.g., the controller chip U2). For example, the source terminal of the transistor 780 (e.g., a MOSFET M2) is connected to the anode of the body diode 790, and the gate terminal of the transistor 780 (e.g., a MOSFET M2) is connected to the terminal 766 (e.g., Gate) of the controller 760 for synchronous rectification (e.g., the controller chip U2). As an example, another terminal of the capacitor 770 (e.g., $C_O$), the source terminal of the transistor 780 (e.g., a MOSFET M2), and the terminal 768 (e.g., GND) of the controller 760 for synchronous rectification (e.g., the controller chip U2) all are biased to the ground voltage on the secondary side. In certain examples, the terminal 4762 (e.g., $V_{cc}$) is connected to one terminal of the capacitor 4764, and another terminal of the capacitor 4764 is biased to the ground voltage on the secondary side.

In some embodiments, the output voltage 772 (e.g., $V_O$) represents the voltage drop between the two terminals of the capacitor 770 (e.g., $C_O$). In certain examples, in addition to the output voltage 772 (e.g., $V_O$), the flyback power converter 700 also provides an output current 774. For example, a current 746 flows through the primary winding 710 (e.g., $N_p$), and a current 792 flows through the secondary winding 712 (e.g., $N_s$). In some examples, the controller 760 for synchronous rectification (e.g., the controller chip U2) receives a voltage 794 through the terminal 762 (e.g., $V_D$) from the drain terminal of the transistor 780 (e.g., a MOSFET M2), receives a voltage 4770 through the terminal 764 (e.g., $V_{out}$), receives a voltage 4772 through the terminal 768 (e.g., GND), and outputs a voltage 796 through the terminal 766 (e.g., Gate) to the gate terminal of the transistor 780 (e.g., a MOSFET M2). For example, the voltage 4770 is equal to the output voltage 772 (e.g., $V_O$). As an example, the voltage 4772 is equal to the ground voltage on the secondary side.

As shown in FIG. 7, the resistor 4716 (e.g., $R_1$) and the resistor 4718 (e.g., $R_2$) are parts of a voltage divider according to certain embodiments. In some examples, the voltage divider and the auxiliary winding 2714 (e.g., $N_{aux}$) are used to generate a feedback signal 4717, which represents the output voltage 772 (e.g., $V_O$) of the flyback power converter 700 during demagnetization of the transformer (e.g., the transformer T1). For example, the transformer (e.g., the transformer T1) includes the primary winding 710 (e.g., $N_p$), the secondary winding 712 (e.g., $N_s$), and the auxiliary winding 2714 (e.g., $N_{aux}$). As an example, the feedback signal 4717 is received by the terminal 4754 (e.g., FB) of the pulse-width-modulation controller 752 (e.g., the controller chip U1), which in response regulates the output voltage 772 (e.g., $V_O$) based at least in part on the feedback signal 4717. In certain examples, the controller 760 for synchronous rectification (e.g., a controller chip U2) detects the state of the secondary winding 712 (e.g., $N_s$) through the terminal 762 (e.g., $V_D$) to turn on and/or turn off the transistor 780 (e.g., a MOSFET M2).

According to some embodiments, the terminal 764 (e.g., $V_{out}$) of the controller 760 for synchronous rectification (e.g., the controller chip U2) is connected to one terminal of the capacitor 770 (e.g., $C_O$), and the terminal 768 (e.g., GND) of the controller 760 for synchronous rectification (e.g., the controller chip U2) and another terminal of the capacitor 770 (e.g., $C_O$) both are biased to the ground voltage on the secondary side. For example, the output voltage 772 (e.g., $V_O$) represents the voltage drop between the two terminals of the capacitor 770 (e.g., $C_O$). In some examples, a voltage difference from the terminal 764 (e.g., $V_{out}$) of the controller 760 to the terminal 768 (e.g., GND) of the controller 760 is equal to the output voltage 772 (e.g., $V_O$). For example, the voltage difference from the terminal 764 (e.g., $V_{out}$) of the controller 760 to the terminal 768 (e.g., GND) of the controller 760 is equal to the voltage 4770 at the terminal 764 (e.g., $V_{out}$) minus the voltage 4772 at the terminal 768 (e.g., GND). As an example, the controller 760 receives the voltage 4770 at the terminal 764 (e.g., $V_{out}$) and the voltage 4772 at the terminal 768 (e.g., GND) and determines the output voltage 772 (e.g., $V_O$) to be equal to the voltage 4770 minus the voltage 4772.

In certain embodiments, the output detector 5702 uses the voltage 4770 received at the terminal 764 (e.g., $V_{out}$) and the voltage 4772 received at the terminal 768 (e.g., GND) and determines the output voltage 772 (e.g., $V_O$) to be equal to the voltage 4770 minus the voltage 4772. In some examples, the output detector 5702 also generates control signals 5712 and 5714 based at least in part on the output voltage 772 (e.g., $V_O$). For example, if the output detector 5702 detects that the output voltage 772 (e.g., $V_O$) increases with time and/or the output voltage 772 (e.g., $V_O$) exceeds an upper threshold, the output detector 5702 generates the control signal 5712 to enable the output damper 5706 and generates the control signal 5714 to disable the pulse generator 5708. As an example, if the output detector 5702 detects that the output voltage 772 (e.g., $V_O$) decreases with time and/or the output voltage 772 (e.g., $V_O$) falls below a lower threshold, the output detector 5702 generates the control signal 5712 to disable the output damper 5706 and generates the control signal 5714 to enable the pulse generator 5708. In certain examples, if the output detector 5702 detects that the output voltage 772 (e.g., $V_O$) remains constant with time and/or remains between the upper threshold and the lower threshold, the output detector 5702 generates the control signal 5712 to disable the output damper 5706 and also generates the control signal 5714 to disable the pulse generator 5708. For example, the lower threshold is smaller than the upper threshold.

In some embodiments, the output damper 5706 receives the control signal 5712. In certain examples, if the output damper 5706 is enabled by the control signal 5712, the output damper 5706 generates a clamping signal 5716 in order to clamp the output voltage 772 (e.g., $V_O$). As an example, the clamping signal 5716 is a current that flows into the controller 760 for synchronous rectification (e.g., a controller chip U2) through the terminal 764 (e.g., $V_{out}$) to discharge the capacitor 770 (e.g., $C_O$). In some examples, if the output damper 5706 is disabled by the control signal 5712, the output damper 5706 does not generate the clamping signal 5716.

In certain embodiments, the pulse generator 5708 receives the control signal 5714. In some examples, if the pulse generator 5708 is enabled by the control signal 5714, the pulse generator 5708 generates a pulse signal 5718. For example, the pulse signal 5718 is a pulse current that flows out of the controller 760 for synchronous rectification (e.g., a controller chip U2) through the terminal 762 (e.g., $V_D$), and the pulse current includes one or more current pulses. As an example, the pulse signal 5718 generates one or more pulses in the feedback signal 4717, and the one or more pulses in the feedback signal 4717 cause the pulse-width-modulation controller 752 (e.g., the controller chip U1) to increase the output voltage 772 (e.g., $V_O$). In certain examples, if the pulse generator 5708 is disabled by the control signal 5714, the pulse generator 5708 does not generate the pulse signal 5718. In some examples, the drive signal generator 5710 receives the voltage 794 through the terminal 762 (e.g., $V_D$), generates the voltage 796 based at least in part on the voltage 794, and outputs the voltage 796 through the terminal 766 (e.g., Gate) to the gate terminal of the transistor 780 (e.g., a MOSFET M2).

According to some embodiments, if the system load (e.g., the output current 774) for the flyback power converter 700 changes from no load to full load, when the controller 760 for synchronous rectification (e.g., the controller chip U2) detects that the output voltage 772 (e.g., $V_O$) decreases with time and/or the output voltage 772 (e.g., $V_O$) falls below the lower threshold, the controller 760 for synchronous rectification (e.g., the controller chip U2) in response generates the pulse current 5718 that includes one or more current pulses. For example, if the system load is at no load, the output current 774 is equal to zero, and if the system load is at full load, the output current 774 is equal to a predetermined maximum. As an example, the pulse current 5718 generates one or more pulses in the feedback signal 4717, and the one or more pulses in the feedback signal 4717 cause the pulse-width-modulation controller 752 (e.g., the controller chip U1) to increase the system energy input and also raise and/or stabilize the system output voltage 772 (e.g., $V_O$). According to certain embodiments, if the system load (e.g., the output current 774) for the flyback power converter 700 changes from full load to no load, when the controller 760 for synchronous rectification (e.g., the controller chip U2) detects that the output voltage 772 (e.g., $V_O$) increases with time and/or the output voltage 772 (e.g., $V_O$) exceeds the upper threshold, the controller 760 for synchronous rectification (e.g., the controller chip U2) in response generates the clamping current 5716 to reduce and/or stabilize the system output voltage 772 (e.g., $V_O$).

Figure 8:
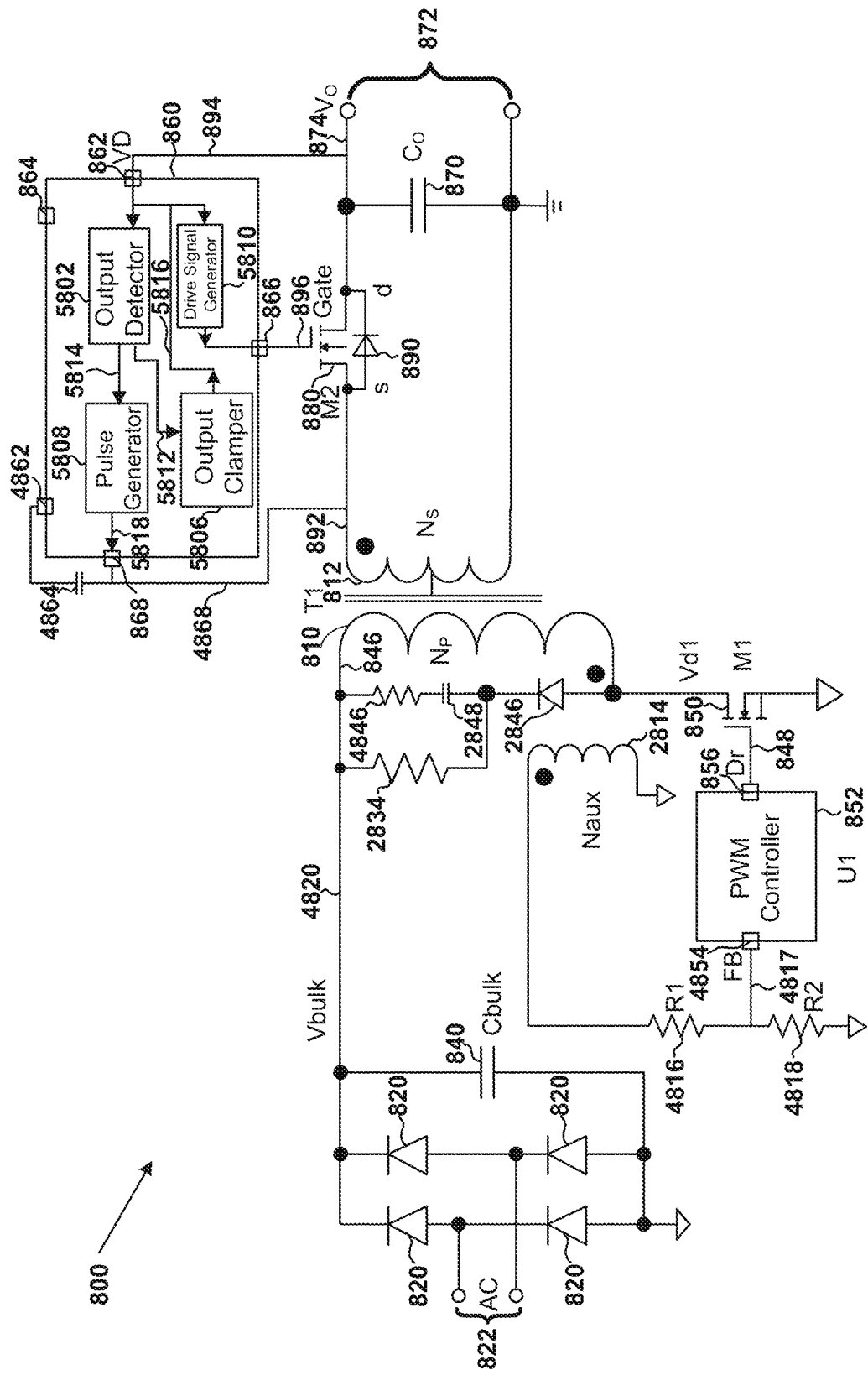
FIG. 8 is a simplified diagram showing a flyback power converter with synchronous rectification according to some embodiments of the present invention.

FIG. 8 is a simplified diagram showing a flyback power converter with synchronous rectification according to some embodiments of the present invention. This diagram is merely an example, which should not unduly limit the scope of the claims. One of ordinary skill in the art would recognize many variations, alternatives, and modifications. As shown in FIG. 8, the flyback power converter 800 includes a primary winding 810 (e.g., $N_p$), a secondary winding 812 (e.g., $N_s$), and an auxiliary winding 2814, all of which are parts of a transformer (e.g., a transformer T1). On the primary side, the flyback power converter 800 also includes a bridge rectifier 820 (e.g., a rectifier that includes four diodes), a capacitor 840 (e.g., $C_{bulk}$), a transistor 850 (e.g., a power MOSFET M1), a pulse-width-modulation controller 852 (e.g., a controller chip U1), a resistor 2834, a diode 2846, a capacitor 2848, a resistor 4816 (e.g., $R_1$), a resistor 4818 (e.g., $R_2$), and a resistor 4846. For example, the resistors 2834 and 4846, the diode 2846, and the capacitor 2848 are parts of a Resistor-Capacitor-Diode (RCD) clamp circuit. Additionally, on the secondary side, the flyback power converter 800 also includes a controller 860 for synchronous rectification (e.g., a controller chip U2), a capacitor 870 (e.g., $C_O$), a transistor 880 (e.g., a MOSFET M2), and a body diode 890 (e.g., a parasitic diode of the transistor 880). For example, the controller 860 for synchronous rectification (e.g., a controller chip U2) includes a terminal 862 (e.g., $V_D$), a terminal 864 (e.g., $V_{out}$), a terminal 866 (e.g., Gate), a terminal 868 (e.g., GND), and a terminal 4862 (e.g., $V_{cc}$). As an example, the controller 860 for synchronous rectification (e.g., a controller chip U2) also includes an output detector 5802, an output damper 5806, a pulse generator 5808, and a drive signal generator 5810. Although the above has been shown using a selected group of components for the flyback power converter 800, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 8, an alternating current (AC) input voltage 822 is rectified by the bridge rectifier 820 and then filtered by the capacitor 840 (e.g., $C_{bulk}$) according to certain embodiments. In some examples, one terminal of the capacitor 840 (e.g., $C_{bulk}$) is biased to a voltage 4820 (e.g., $V_{bulk}$) and is connected to one terminal of the primary winding 810 (e.g., $N_p$). For example, the one terminal of the primary winding 810 (e.g., $N_p$) is connected to one terminal of the resistor 2834 and one terminal of the resistor 4846. As an example, another terminal of the resistor 4846 is connected to one terminal of the capacitor 2848. In certain examples, another terminal of the resistor 2834 and another terminal of the capacitor 2848 are connected to one terminal of the diode 2846. In certain examples, another terminal of the primary winding 810 (e.g., $N_p$) is connected to another terminal of the diode 2846 and the drain terminal of the transistor 850 (e.g., a MOSFET M1). For example, one terminal of the auxiliary winding 2814 is connected to one terminal of the resistor 4816 (e.g., $R_1$). As an example, another terminal of the resistor 4816 (e.g., $R_1$) is connected to a terminal 4854 (e.g., FB) of the pulse-width-modulation controller 852 (e.g., the controller chip U1) and one terminal of the resistor 4818 (e.g., $R_2$). In some examples, another terminal of the auxiliary winding 2814 and another terminal of the resistor 4818 (e.g., $R_2$) are biased to the ground voltage on the primary side. For example, a terminal 856 (e.g., Dr) of the pulse-width-modulation controller 852 (e.g., the controller chip U1) is connected to the gate terminal of the transistor 850 (e.g., a MOSFET M1). As an example, the pulse-width-modulation controller 852 (e.g., the controller chip U1) determines the switching frequency of the flyback power converter 800 and outputs a voltage 848 through the terminal 856 (e.g., Dr) to the gate terminal of the transistor 850 (e.g., a MOSFET M1). In certain examples, the source terminal of the transistor 850 (e.g., a MOSFET M1) is biased to the ground voltage on the primary side.

In some embodiments, one terminal of the secondary winding 812 (e.g., $N_s$) is biased to a voltage 4868 and is connected to the anode of the body diode 890, the source terminal of the transistor 880 (e.g., a MOSFET M2), and the terminal 868 (e.g., GND) of the controller 860 for synchronous rectification (e.g., the controller chip U2). In certain examples, another terminal of the secondary winding 812 (e.g., $N_s$) is biased to the ground voltage on the secondary side. For example, the gate terminal of the transistor 880 (e.g., a MOSFET M2) is connected to the terminal 866 (e.g., Gate) of the controller 860 for synchronous rectification (e.g., the controller chip U2). As an example, the drain terminal of the transistor 880 (e.g., a MOSFET M2) is connected to the cathode of the body diode 890, the terminal 862 (e.g., $V_D$) of the controller 860 for synchronous rectification (e.g., the controller chip U2), and one terminal of the capacitor 870 (e.g., $C_O$). For example, another terminal of the capacitor 870 (e.g., $C_O$) is biased to the ground voltage on the secondary side. In some examples, the terminal 4262 (e.g., $V_{cc}$) is connected to one terminal of the capacitor 4264, and another terminal of the capacitor 4264 is biased to the voltage 4268 and is connected to the terminal 268 (e.g., GND) of the controller 260 for synchronous rectification (e.g., the controller chip U2). For example, the output voltage 872 (e.g., $V_O$) represents the voltage drop between the two terminals of the capacitor 870 (e.g., $C_O$). As an example, in addition to the output voltage 872 (e.g., $V_O$), the flyback power converter 800 also provides an output current 874. In certain examples, the terminal 864 (e.g., $V_{out}$) of the controller 860 for synchronous rectification (e.g., the controller chip U2) is not biased (e.g., floating electrically).

In certain embodiments, a current 846 flows through the primary winding 810, and a current 892 flows through the secondary winding 812 (e.g., $N_s$). In some examples, the controller 860 for synchronous rectification (e.g., the controller chip U2) receives a voltage 894 through the terminal 862 (e.g., $V_D$) from the drain terminal of the transistor 880 (e.g., a MOSFET M2), and outputs a voltage 896 through the terminal 866 (e.g., Gate) to the gate terminal of the transistor 880 (e.g., a MOSFET M2). For example, the voltage 894 with respect to the ground voltage on the secondary side is equal to the output voltage 872 (e.g., $V_O$).

As shown in FIG. 8, the resistor 4816 (e.g., $R_1$) and the resistor 4818 (e.g., $R_2$) are parts of a voltage divider according to some embodiments. In certain examples, the voltage divider and the auxiliary winding 2814 (e.g., $N_{aux}$) are used to generate a feedback signal 4817, which represents the output voltage 872 (e.g., $V_O$) of the flyback power converter 800 during demagnetization of the transformer (e.g., the transformer T1). For example, the transformer (e.g., the transformer T1) includes the primary winding 810 (e.g., $N_p$), the secondary winding 812 (e.g., $N_s$), and the auxiliary winding 2814 (e.g., $N_{aux}$). As an example, the feedback signal 4817 is received by the terminal 4854 (e.g., FB) of the pulse-width-modulation controller 852 (e.g., the controller chip U1), which in response regulates the output voltage 872 (e.g., $V_O$) based at least in part on the feedback signal 4817. In some examples, the controller 860 for synchronous rectification (e.g., a controller chip U2) detects the state of the secondary winding 812 (e.g., $N_s$) through the terminal 862 (e.g., $V_D$) to turn on and/or turn off the transistor 880 (e.g., a MOSFET M2).

According to certain embodiments, after the transistor 850 (e.g., a power MOSFET M1) is turned off, the transformer (e.g., a transformer T1) of the flyback power converter 800 enters demagnetization and the transistor 880 (e.g., a MOSFET M2) is turned on, causing the terminal 868 (e.g., GND) of the controller 860 for synchronous rectification (e.g., the controller chip U2) to be biased to a voltage that is equal to $V_O+I_{sec} \times R_{dson}$ with respect to the ground voltage on the secondary side, wherein $V_O$ represents the output voltage 872, $I_{sec}$ represents the current 892 that flows through the secondary winding 812, and $R_{dson}$ represents the on resistance of the transistor 880 (e.g., a MOSFET M2).

In some examples, after the demagnetization of the transformer (e.g., a transformer T1) of the flyback power converter 800 has ended, the transistor 880 (e.g., a MOSFET M2) is turned off and the voltage 4868 undergoes resonance around the ground voltage on the secondary side with an initial amplitude equal to the output voltage 872 (e.g., $V_O$). For example, the resonance becomes attenuated with time, and the amplitude gradually becomes zero.

In certain examples, after the amplitude of the resonance becomes zero, the voltage 4868 of the terminal 868 (e.g., GND) is the same as the ground voltage on the secondary side. For example, the terminal 862 (e.g., $V_D$) of the controller 860 for synchronous rectification (e.g., the controller chip U2) is connected to one terminal of the capacitor 870 (e.g., $C_O$), and another terminal of the capacitor 870 (e.g., $C_O$) is biased to the ground voltage on the secondary side. As an example, the output voltage 872 (e.g., $V_O$) represents the voltage drop between the two terminals of the capacitor 870 (e.g., $C_O$). In some examples, after the amplitude of the resonance becomes zero, a voltage difference from the terminal 862 (e.g., $V_D$) of the controller 860 to the terminal 868 (e.g., GND) of the controller 860 is equal to the output voltage 872 (e.g., $V_O$). For example, the voltage difference from the terminal 862 (e.g., $V_D$) of the controller 860 to the terminal 868 (e.g., GND) of the controller 860 is equal to the voltage 894 at the terminal 862 (e.g., $V_D$) minus the voltage 4868 at the terminal 868 (e.g., GND). As an example, the controller 860 receives the voltage 894 at the terminal 862 (e.g., $V_D$) and the voltage 4868 at the terminal 868 (e.g., GND) and after the amplitude of the resonance becomes zero, determines the output voltage 872 (e.g., $V_O$) to be equal to the voltage 894 minus the voltage 4868.

In certain embodiments, the output detector 5802 uses the voltage 894 received by the terminal 862 (e.g., $V_D$) and the voltage 4868 received by the terminal 868 (e.g., GND), and after the end of the demagnetization of the transformer (e.g., a transformer T1), when the amplitude of the resonance is zero, determines the output voltage 872 (e.g., $V_O$) to be equal to the voltage 894 minus the voltage 4868. In some examples, the output detector 5802 also generates control signals 5812 and 5814 based at least in part on the output voltage 872 (e.g., $V_O$) when the amplitude of the resonance is zero after the end of the demagnetization of the transformer (e.g., a transformer T1). For example, if the output detector 5802 detects that, when the amplitude of the resonance is zero after the end of the demagnetization of the transformer (e.g., a transformer T1), the output voltage 872 (e.g., $V_O$) increases with time and/or the output voltage 872 (e.g., $V_O$) exceeds an upper threshold, the output detector 5802 generates the control signal 5812 to enable the output damper 5806 and generates the control signal 5814 to disable the pulse generator 5808. As an example, if the output detector 5802 detects that, when the amplitude of the resonance is zero after the end of the demagnetization of the transformer (e.g., a transformer T1), the output voltage 872 (e.g., $V_O$) decreases with time and/or the output voltage 872 (e.g., $V_O$) falls below a lower threshold, the output detector 5802 generates the control signal 5812 to disable the output damper 5806 and generates the control signal 5814 to enable the pulse generator 5808. In certain examples, if the output detector 5802 detects that, when the amplitude of the resonance is zero after the end of the demagnetization of the transformer (e.g., a transformer T1), the output voltage 872 (e.g., $V_O$) remains constant with time and/or remains between the upper threshold and the lower threshold, the output detector 5802 generates the control signal 5812 to disable the output damper 5806 and also generates the control signal 5814 to disable the pulse generator 5808. For example, the lower threshold is smaller than the upper threshold.

In some embodiments, the output damper 5806 receives the control signal 5812. In certain examples, if the output damper 5806 is enabled by the control signal 5812, the output damper 5806 generates a clamping signal 5816 in order to clamp the output voltage 872 (e.g., $V_O$). As an example, the clamping signal 5816 is a current that flows into the controller 860 for synchronous rectification (e.g., a controller chip U2) through the terminal 862 (e.g., $V_D$) to discharge the capacitor 870 (e.g., $C_O$). In some examples, if the output damper 5806 is disabled by the control signal 5812, the output damper 5806 does not generate the clamping signal 5816.

In certain embodiments, the pulse generator 5808 receives the control signal 5814. In some examples, if the pulse generator 5808 is enabled by the control signal 5814, the pulse generator 5808 generates a pulse signal 5818. For example, the pulse signal 5818 is a pulse current that flows out of the controller 860 for synchronous rectification (e.g., a controller chip U2) through the terminal 868 (e.g., GND), and the pulse current includes one or more current pulses. As an example, the pulse signal 5818 generates one or more pulses in the feedback signal 4817, and the one or more pulses in the feedback signal 4817 cause the pulse-width-modulation controller 852 (e.g., the controller chip U1) to increase the output voltage 872 (e.g., $V_O$). In certain examples, if the pulse generator 5808 is disabled by the control signal 5814, the pulse generator 5808 does not generate the pulse signal 5818. In some examples, the drive signal generator 5810 receives the voltage 894 through the terminal 862 (e.g., $V_D$), generates the voltage 896 based at least in part on the voltage 894, and outputs the voltage 896 through the terminal 866 (e.g., Gate) to the gate terminal of the transistor 880 (e.g., a MOSFET M2).

According to some embodiments, if the system load (e.g., the output current 874) for the flyback power converter 800 changes from no load to full load, when the controller 860 for synchronous rectification (e.g., the controller chip U2) detects that the output voltage 872 (e.g., $V_O$) decreases with time and/or the output voltage 872 (e.g., $V_O$) falls below the lower threshold, the controller 860 for synchronous rectification (e.g., the controller chip U2) in response generates the pulse current 5818 that includes one or more current pulses. For example, if the system load is at no load, the output current 874 is equal to zero, and if the system load is at full load, the output current 874 is equal to a predetermined maximum. As an example, the pulse current 5818 generates one or more pulses in the feedback signal 4817, and the one or more pulses in the feedback signal 4817 cause the pulse-width-modulation controller 852 (e.g., the controller chip U1) to increase the system energy input and also raise and/or stabilize the system output voltage 872 (e.g., $V_O$). According to certain embodiments, if the system load (e.g., the output current 874) for the flyback power converter 800 changes from full load to no load, when the controller 860 for synchronous rectification (e.g., the controller chip U2) detects that the output voltage 872 (e.g., $V_O$) increases with time and/or the output voltage 872 (e.g., $V_O$) exceeds the upper threshold, the controller 860 for synchronous rectification (e.g., the controller chip U2) in response generates the clamping current 5816 to reduce and/or stabilize the system output voltage 872 (e.g., $V_O$).

Figure 9:
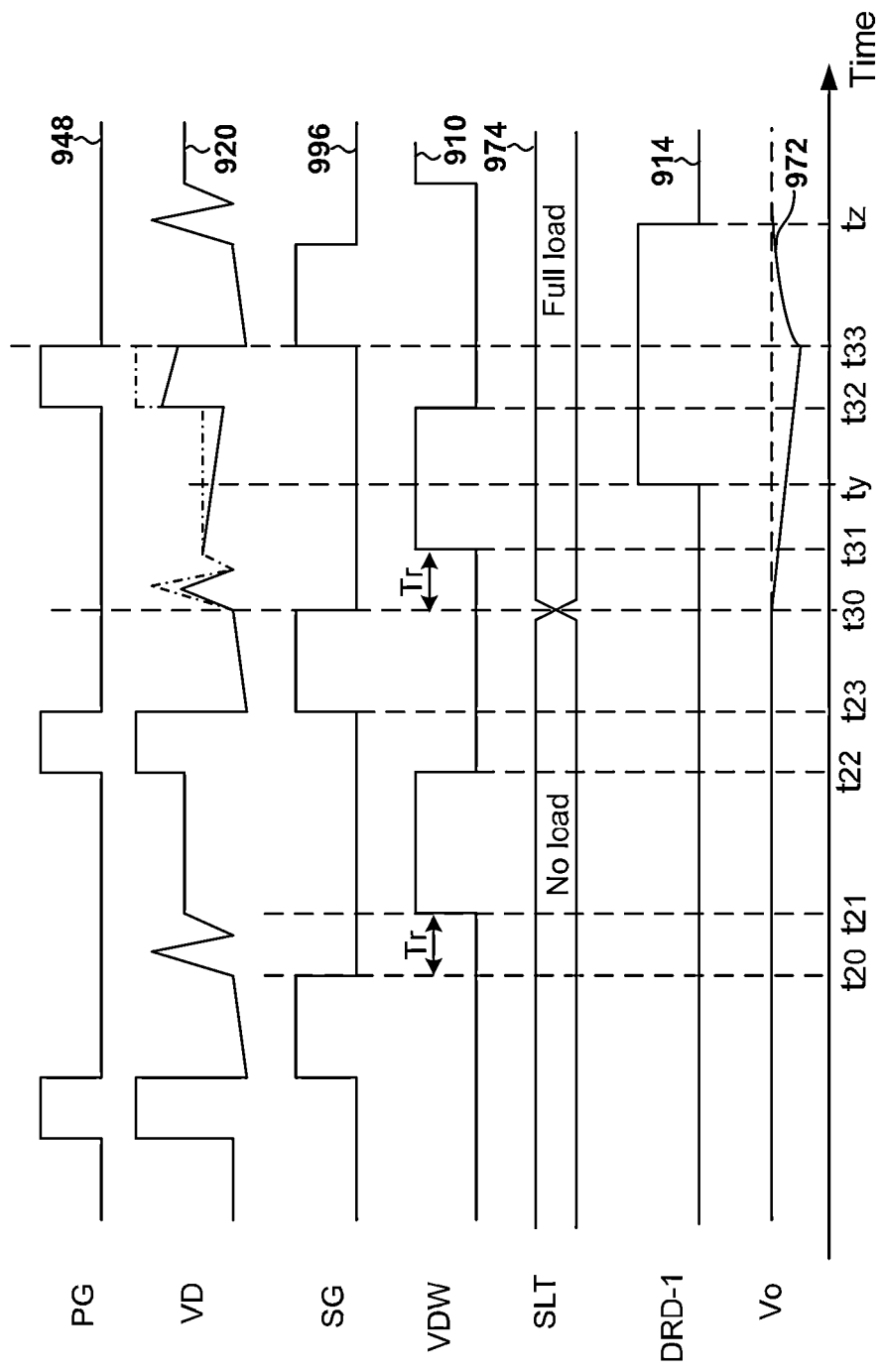
FIG. 9 shows simplified timing diagrams related to dynamic response when system load changes from no load to full load after demagnetization for the flyback power converter as shown in FIG. 8 according to certain embodiments of the present invention.

FIG. 9 shows simplified timing diagrams related to dynamic response when system load changes from no load to full load after demagnetization for the flyback power converter 800 as shown in FIG. 8 according to certain embodiments of the present invention. These diagrams are merely examples, which should not unduly limit the scope of the claims. One of ordinary skill in the art would recognize many variations, alternatives, and modifications. The waveform 948 represents the voltage 848 as a function of time, the waveform 920 represents the voltage 894 minus the voltage 4868 as a function of time, the waveform 996 represents the voltage 896 as a function of time, the waveform 910 represents one or more voltage detection windows after demagnetization by the output detector 5802 of the controller 860 for synchronous rectification as a function of time, the waveform 974 represents the system load (e.g., the output current 874) of the flyback power converter 800 as a function of time, the waveform 914 represents the control signal 5814 as a function of time, and the waveform 972 represents the output voltage 872 as a function of time.

According to some embodiments, at time $t_0$, the voltage 896 changes from a logic high level to a logic low level as shown by the waveform 996, and the demagnetization of the transformer (e.g., a transformer T1) of the flyback power converter 800 ends. In certain examples, from time $t_{20}$ to time $t_{21}$, the voltage 4868 undergoes resonance around the ground voltage on the secondary side with an initial amplitude equal to the output voltage 872 (e.g., $V_O$). In certain examples, from time $t_0$ to time $t_{21}$, the resonance becomes attenuated with time and the amplitude gradually becomes zero. For example, the time duration from time $t_0$ to time $t_{21}$ is represented by $T_r$ (e.g., 100 μs). As an example, the time duration from time $t_0$ to time $t_{21}$ is a predetermined delay. In some examples, after time $t_{21}$, the amplitude of the resonance is equal to zero, and the voltage 4868 of the terminal 868 (e.g., GND) is the same as the ground voltage on the secondary side.

According to certain embodiments, from time $t_{21}$ to time $t_{22}$, the voltage 894 minus the voltage 4868 as shown by the waveform 920 is equal to the output voltage 872 (e.g., $V_O$) as shown by the waveform 972. In some examples, from time $t_{21}$ to time $t_{22}$, the output detector 5802 of the controller 860 for synchronous rectification uses the voltage 894 and the voltage 4868 and determines the output voltage 872 (e.g., $V_O$) to be equal to the voltage 894 minus the voltage 4868 as shown by the waveform 920. For example, at time $t_{21}$, the output detector 5802 of the controller 860 for synchronous rectification starts detecting the output voltage 872 (e.g., $V_O$), and at time $t_{22}$, the output detector 5802 of the controller 860 for synchronous rectification stops detecting the output voltage 872 (e.g., $V_O$). As an example, the time duration from time $t_{21}$ to time $t_{22}$ is a voltage detection window, during which the output detector 5802 detects the output voltage 872 (e.g., $V_O$). In certain examples, at time $t_{23}$, the voltage 896 changes from the logic low level to the logic high level as shown by the waveform 996, and the demagnetization of the transformer (e.g., a transformer T1) of the flyback power converter 800 starts.

In some embodiments, from time $t_{23}$ to time $t_{30}$, the voltage 896 remains at the logic high level as shown by the waveform 996, and the transformer (e.g., a transformer T1) of the flyback power converter 800 undergoes the demagnetization. In certain examples, at time $t_{30}$, the voltage 896 changes from the logic high level to the logic low level as shown by the waveform 996, and the demagnetization of the transformer (e.g., a transformer T1) of the flyback power converter 800 ends. In some examples, from time $t_{30}$ to time $t_{31}$, the voltage 4868 undergoes resonance around the ground voltage on the secondary side with an initial amplitude equal to the output voltage 872 (e.g., $V_O$). In some examples, from time $t_{30}$ to time $t_{31}$, the resonance becomes attenuated with time and the amplitude gradually becomes zero. For example, the time duration from time $t_{30}$ to time $t_{31}$ is represented by $T_r$ (e.g., 100 μs). As an example, the time duration from time $t_{30}$ to time $t_{31}$ is a predetermined delay. In some examples, after time $t_{31}$, the amplitude of the resonance is equal to zero, and the voltage 4868 of the terminal 868 (e.g., GND) is the same as the ground voltage on the secondary side.

In certain embodiments, from time $t_{31}$ to time $t_{32}$, the voltage 894 minus the voltage 4868 as shown by the waveform 920 is equal to the output voltage 872 (e.g., $V_O$) as shown by the waveform 972. In some examples, from time $t_{31}$ to time $t_{32}$, the output detector 5802 of the controller 860 for synchronous rectification uses the voltage 894 and the voltage 4868 and determines the output voltage 872 (e.g., $V_O$) to be equal to the voltage 894 minus the voltage 4868 as shown by the waveform 920. For example, at time $t_{31}$, the output detector 5802 of the controller 860 for synchronous rectification starts detecting the output voltage 872 (e.g., $V_O$), and at time $t_{32}$, the output detector 5802 of the controller 860 for synchronous rectification stops detecting the output voltage 872 (e.g., $V_O$). As an example, the time duration from time $t_{31}$ to time $t_{32}$ is a voltage detection window, during which the output detector 5802 detects the output voltage 872 (e.g., $V_O$). In certain examples, at time $t_{33}$, the voltage 896 changes from the logic low level to the logic high level as shown by the waveform 996, and the demagnetization of the transformer (e.g., a transformer T1) of the flyback power converter 800 starts.

According to some embodiments, at time $t_{30}$, the system load (e.g., the output current 874) for the flyback power converter 800 changes from no load to full load immediately after the end of the demagnetization as shown by the waveform 974. In certain examples, before time $t_{30}$, the flyback power converter 800 operates at no load and the system operating frequency (e.g., the switching frequency) of the flyback power converter 800 is low. In some examples, after time $t_{30}$, the output voltage 872 (e.g., $V_O$) decreases with time as shown by the waveform 972, and after time $t_{31}$, the voltage 894 minus the voltage 4868 also decreases with time as shown by the waveform 920.

According to certain embodiments, after time $t_{30}$, from time $t_{31}$ to time $t_{32}$, the output detector 5802 of the controller 860 for synchronous rectification determines the output voltage 872 (e.g., $V_O$) to be equal to the voltage 894 minus the voltage 4868 as shown by the waveform 920. In some examples, between time $t_{31}$ and time $t_{32}$, the output detector 5802 of the controller 860 for synchronous rectification detects that the output voltage 872 (e.g., $V_O$) decreases with time and/or the output voltage 872 (e.g., $V_O$) falls below a lower threshold, and in response, at time $t_y$, the output detector 5802 of the controller 860 for synchronous rectification changes the control signal 5814 from a logic low level to a logic high level. For example, from time $t_y$ to time $t_z$, the control signal 5814 remains at the logic high level as shown by the waveform 914. As an example, at time $t_z$, the control signal 5814 changes from the logic high level to the logic low level as shown by the waveform 914. In certain examples, if the control signal 5814 is at the logic high level, the pulse generator 5808 is enabled, and if the control signal 5814 is at the logic low level, the pulse generator 5808 is disabled. For example, at time $t_y$, the pulse generator 5808 changes from being disabled to being enabled. As an example, from time $t_y$ to time $t_z$, the pulse generator 5808 remains enabled. For example, at time $t_z$, the pulse generator 5808 changes from being enabled to being disabled.

In some embodiments, when the pulse generator 5808 is enabled from time $t_y$ to time $t_z$, the pulse generator 5808 generates the pulse current 5818 that includes one or more current pulses. As an example, the pulse current 5818 generates one or more pulses in the feedback signal 4817, and the one or more pulses in the feedback signal 4817 cause the pulse-width-modulation controller 852 (e.g., the controller chip U1) to raise and/or stabilize the system output voltage 872 (e.g., $V_O$) as shown by the waveform 972. For example, time $t_y$ is after time $t_{31}$ but before time $t_{32}$, and time $t_z$ is after time $t_{33}$.

Figure 10:
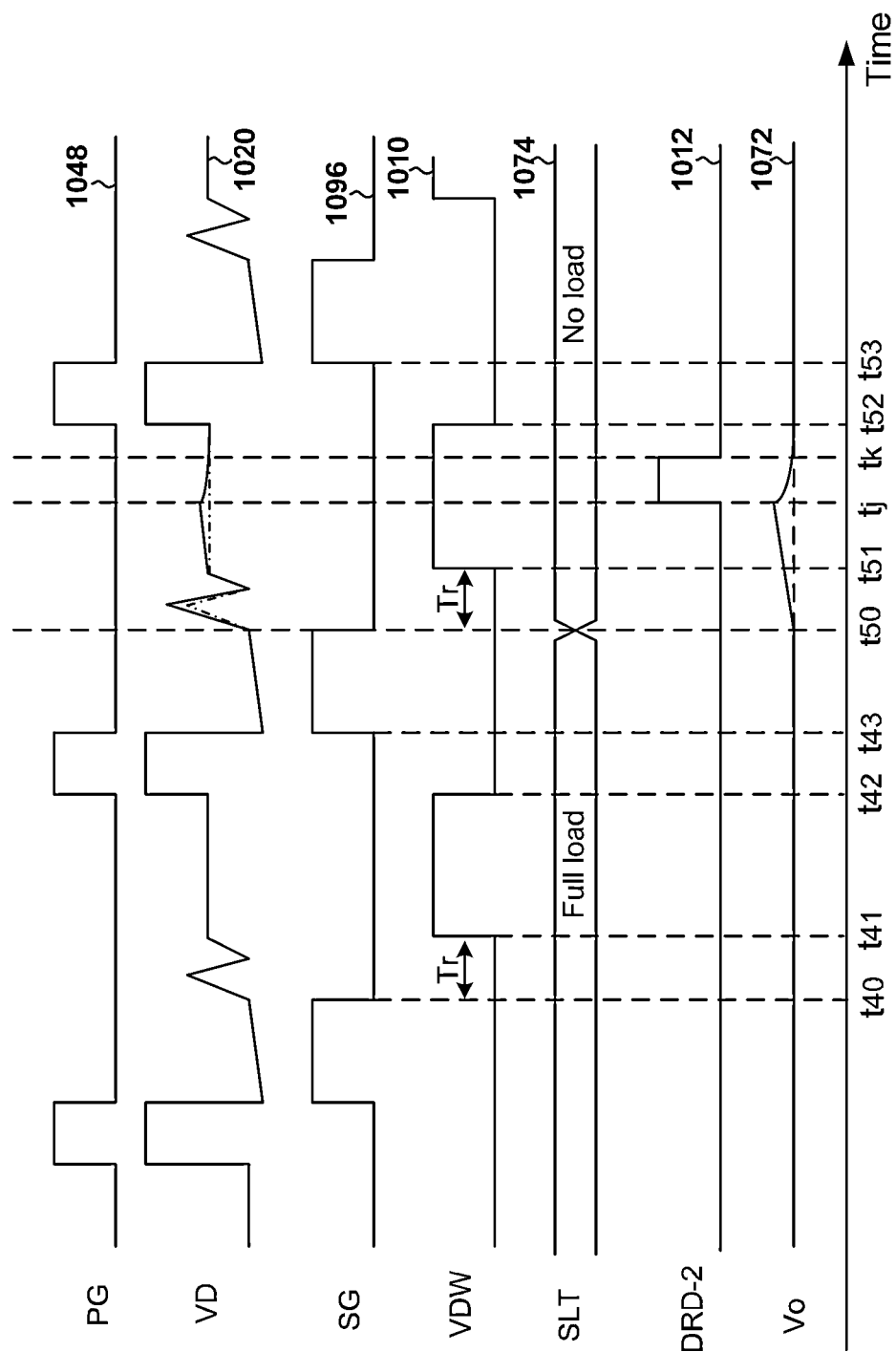
FIG. 10 shows simplified timing diagrams related to dynamic response when system load changes from full load to no load after demagnetization for the flyback power converter as shown in FIG. 8 according to some embodiments of the present invention.

FIG. 10 shows simplified timing diagrams related to dynamic response when system load changes from full load to no load after demagnetization for the flyback power converter 800 as shown in FIG. 8 according to some embodiments of the present invention. These diagrams are merely examples, which should not unduly limit the scope of the claims. One of ordinary skill in the art would recognize many variations, alternatives, and modifications. The waveform 1048 represents the voltage 848 as a function of time, the waveform 1020 represents the voltage 894 minus the voltage 4868 as a function of time, the waveform 1096 represents the voltage 896 as a function of time, the waveform 1010 represents one or more voltage detection windows after demagnetization by the output detector 5802 of the controller 860 for synchronous rectification as a function of time, the waveform 1074 represents the system load (e.g., the output current 874) of the flyback power converter 800 as a function of time, the waveform 1012 represents the control signal 5812 as a function of time, and the waveform 1072 represents the output voltage 872 as a function of time.

According to some embodiments, at time $t_{40}$, the voltage 896 changes from a logic high level to a logic low level as shown by the waveform 1096, and the demagnetization of the transformer (e.g., a transformer T1) of the flyback power converter 800 ends. In certain examples, from time $t_{40}$ to time $t_{41}$, the voltage 4868 undergoes resonance around the ground voltage on the secondary side with an initial amplitude equal to the output voltage 872 (e.g., $V_O$). In certain examples, from time $t_{40}$ to time $t_{41}$, the resonance becomes attenuated with time and the amplitude gradually becomes zero. For example, the time duration from time $t_{40}$ to time $t_{41}$ is represented by $T_r$ (e.g., 100 µs). As an example, the time duration from time $t_{40}$ to time $t_{41}$ is a predetermined delay. In some examples, after time $t_{41}$, the amplitude of the resonance is equal to zero, and the voltage 4868 of the terminal 868 (e.g., GND) is the same as the ground voltage on the secondary side.

According to certain embodiments, from time $t_{41}$ to time $t_{42}$, the voltage 894 minus the voltage 4868 as shown by the waveform 1020 is equal to the output voltage 872 (e.g., $V_O$) as shown by the waveform 1072. In some examples, from time $t_{41}$ to time $t_{42}$, the output detector 5802 of the controller 860 for synchronous rectification uses the voltage 894 and the voltage 4868 and determines the output voltage 872 (e.g., $V_O$) to be equal to the voltage 894 minus the voltage 4868 as shown by the waveform 1020. For example, at time $t_{41}$, the output detector 5802 of the controller 860 for synchronous rectification starts detecting the output voltage 872 (e.g., $V_O$), and at time $t_{42}$, the output detector 5802 of the controller 860 for synchronous rectification stops detecting the output voltage 872 (e.g., $V_O$). As an example, the time duration from time $t_{41}$ to time $t_{42}$ is a voltage detection window, during which the output detector 5802 detects the output voltage 872 (e.g., $V_O$). In certain examples, at time $t_{43}$, the voltage 896 changes from the logic low level to the logic high level as shown by the waveform 1096, and the demagnetization of the transformer (e.g., a transformer T1) of the flyback power converter 800 starts.

In some embodiments, from time $t_{43}$ to time $t_{50}$, the voltage 896 remains at the logic high level as shown by the waveform 1096, and the transformer (e.g., a transformer T1) of the flyback power converter 800 undergoes the demagnetization. In certain examples, at time $t_{50}$, the voltage 896 changes from the logic high level to the logic low level as shown by the waveform 1096, and the demagnetization of the transformer (e.g., a transformer T1) of the flyback power converter 800 ends. In some examples, from time $t_{50}$ to time $t_{51}$, the voltage 4868 undergoes resonance around the ground voltage on the secondary side with an initial amplitude equal to the output voltage 872 (e.g., $V_O$). In some examples, from time $t_{50}$ to time $t_{51}$, the resonance becomes attenuated with time and the amplitude gradually becomes zero. For example, the time duration from time $t_{50}$ to time $t_{51}$ is represented by $T_r$ (e.g., 100 µs). As an example, the time duration from time $t_{50}$ to time $t_{51}$ is a predetermined delay. In some examples, after time $t_{51}$, the amplitude of the resonance is equal to zero, and the voltage 4868 of the terminal 868 (e.g., GND) is the same as the ground voltage on the secondary side.

In certain embodiments, from time $t_{51}$ to time $t_{52}$, the voltage 894 minus the voltage 4868 as shown by the waveform 1020 is equal to the output voltage 872 (e.g., $V_O$) as shown by the waveform 1072. In some examples, from time $t_{51}$ to time $t_{52}$, the output detector 5802 of the controller 860 for synchronous rectification uses the voltage 894 and the voltage 4868 and determines the output voltage 872 (e.g., $V_O$) to be equal to the voltage 894 minus the voltage 4868 as shown by the waveform 1020. For example, at time $t_{51}$, the output detector 5802 of the controller 860 for synchronous rectification starts detecting the output voltage 872 (e.g., $V_O$), and at time $t_{52}$, the output detector 5802 of the controller 860 for synchronous rectification stops detecting the output voltage 872 (e.g., $V_O$). As an example, the time duration from time $t_{51}$ to time $t_{52}$ is a voltage detection window, during which the output detector 5802 detects the output voltage 872 (e.g., $V_O$). In certain examples, at time $t_{53}$, the voltage 896 changes from the logic low level to the logic high level as shown by the waveform 1096, and the demagnetization of the transformer (e.g., a transformer T1) of the flyback power converter 800 starts.

According to some embodiments, at time $t_{50}$, the system load (e.g., the output current 874) for the flyback power converter 800 changes from full load to no load immediately after the end of the demagnetization as shown by the waveform 1074. In certain examples, before time $t_{50}$, the flyback power converter 800 operates at full load and the system operating frequency (e.g., the switching frequency) of the flyback power converter 800 is high. In some examples, after time $t_{50}$, the output voltage 872 (e.g., $V_O$) increases with time as shown by the waveform 1072, and after time $t_{51}$, the voltage 894 minus the voltage 4868 also increases with time as shown by the waveform 1020.

According to certain embodiments, after time $t_{50}$, from time $t_{51}$ to time $t_{52}$, the output detector 5802 of the controller 860 for synchronous rectification determines the output voltage 872 (e.g., $V_O$) to be equal to the voltage 894 minus the voltage 4868 as shown by the waveform 1020. In some examples, between time $t_{51}$ and time $t_{52}$, the output detector 5802 of the controller 860 for synchronous rectification detects that the output voltage 872 (e.g., $V_O$) increases with time and/or the output voltage 872 (e.g., $V_O$) exceeds an upper threshold, and in response, at time $t_j$, the output detector 5802 of the controller 860 for synchronous rectification changes the control signal 5812 from the logic low level to the logic high level.

For example, from time $t_j$ to time $t_k$, the control signal 5812 remains at the logic high level as shown by the waveform 1012. As an example, at time $t_k$, the control signal 5812 changes from the logic high level to the logic low level as shown by the waveform 1012. In certain examples, if the control signal 5812 is at the logic high level, the output damper 5806 is enabled, and if the control signal 5812 is at the logic low level, the output damper 5806 is disabled. For example, at time $t_j$, the output damper 5806 changes from being disabled to being enabled. As an example, from time $t_j$ to time $t_k$, the output damper 5806 remains enabled. For example, at time $t_k$, the output damper 5806 changes from being enabled to being disabled.

In some embodiments, when the output damper 5806 is enabled from time $t_j$ to time $t_k$, the output damper 5806 generates the clamping current 5816 to reduce and/or stabilize the system output voltage 872 (e.g., $V_O$) as shown by the waveform 1072. For example, time $t_j$ is after time $t_{51}$ but before time $t_k$, and time $t_k$ is after time $t_j$ but before time $t_{52}$.

Certain embodiments of the present invention provide a controller for synchronous rectification as part of a flyback power converter, wherein the controller for synchronous rectification can accurately and timely detect the output voltage of the flyback power converter. For example, the flyback power converter can effectively regulate the output voltage based at least in part on the detected output voltage. As an example, the controller for synchronous rectification significantly improves the dynamic response of the flyback power converter.

According to some embodiments, a system for controlling synchronous rectification, the system comprising: a first controller terminal configured to receive a first voltage; and a second controller terminal biased to a second voltage; wherein the system is further configured to: if a voltage difference from the first controller terminal to the second controller terminal satisfies one or more first conditions, generate a first current to flow through the first controller terminal; and if the voltage difference from the first controller terminal to the second controller terminal satisfies one or more second conditions, generate a second current to flow through the second controller terminal; wherein: the voltage difference from the first controller terminal to the second controller terminal is equal to the first voltage minus the second voltage; the one or more first conditions and the one or more second conditions are different; and the second current includes one or more current pulses. For example, the system is implemented according to at least FIG. 8.

As an example, the first current flows into the system through the first controller terminal; and the second current flows out of the system through the second controller terminal. For example, the system is further configured to: if the voltage difference from the first controller terminal to the second controller terminal during a voltage detection window increases with time, generate the first current to flow through the first controller terminal; and if the voltage difference from the first controller terminal to the second controller terminal during the voltage detection window exceeds a first threshold, generate the first current to flow through the first controller terminal. As an example, the system is further configured to: if the voltage difference from the first controller terminal to the second controller terminal during the voltage detection window decreases with time, generate the second current to flow through the second controller terminal; and if the voltage difference from the first controller terminal to the second controller terminal during the voltage detection window falls below a second threshold, generate the second current to flow through the second controller terminal. For example, the second threshold is smaller than the first threshold.

As an example, the system further includes: a third controller terminal different from the first controller terminal and the second controller terminal; wherein the system is further configured to: generate a third voltage based at least in part on the first voltage; and output the third voltage through the third controller terminal to a gate terminal of a transistor. For example, after the third voltage changes from a first voltage level to a second voltage level, with a predetermined delay, the voltage detection window starts. As an example, the first voltage level is a logic high level; and the second voltage level is a logic low level.

For example, the system further includes an output detector configured to receive the first voltage and the second voltage and generate a first control signal and a second control signal based at least in part on the first voltage and the second voltage. As an example, the system further includes: an output damper configured to receive the first control signal and generate the first current based at least in part on the first control signal; and a pulse generator configured to receive the second control signal and generate the second current based at least in part on the second control signal. For example, the output detector is further configured to determine an output voltage to be equal to the first voltage minus the second voltage during a voltage detection window.

As an example, the output detector is further configured to: if the determined output voltage increases with time, generate the first control signal to enable the output damper and generate the second control signal to disable the pulse generator; and if the determined output voltage exceeds a first threshold, generate the first control signal to enable the output damper and generate the second control signal to disable the pulse generator. For example, the output detector is further configured to: if the determined output voltage decreases with time, generate the first control signal to disable the output damper and generate the second control signal to enable the pulse generator; and if the determined output voltage falls below a second threshold, generate the first control signal to disable the output damper and generate the second control signal to enable the pulse generator. As an example, the output damper is further configured to: in response to being enabled by the first control signal, generate the first current; and in response to being disabled by the first control signal, not generate the first current. For example, the pulse generator is further configured to: in response to being enabled by the second control signal, generate the second current; and in response to being disabled by the second control signal, not generate the second current.

According to certain embodiments, a system for controlling synchronous rectification includes: a first controller terminal configured to receive a first voltage; a second controller terminal biased to a second voltage; and a third controller terminal different from the first controller terminal and the second controller terminal; wherein the system is further configured to: if a voltage difference from the first controller terminal to the second controller terminal satisfies one or more first conditions, generate a first current to flow through the first controller terminal; and if the voltage difference from the first controller terminal to the second controller terminal satisfies one or more second conditions, generate a second current to flow through the third controller terminal; wherein: the voltage difference from the first controller terminal to the second controller terminal is equal to the first voltage minus the second voltage; the one or more first conditions and the one or more second conditions are different; and the second current includes one or more current pulses. For example, the system is implemented according to at least FIG. 7.

As an example, the first current flows into the system through the first controller terminal; and the second current flows out of the system through the third controller terminal. For example, the system is further configured to: if the voltage difference from the first controller terminal to the second controller terminal increases with time, generate the first current to flow through the first controller terminal; and if the voltage difference from the first controller terminal to the second controller terminal exceeds a first threshold, generate the first current to flow through the first controller terminal. As an example, the system is further configured to: if the voltage difference from the first controller terminal to the second controller terminal decreases with time, generate the second current to flow through the third controller terminal; and if the voltage difference from the first controller terminal to the second controller terminal falls below a second threshold, generate the second current to flow through the third controller terminal. For example, the second threshold is smaller than the first threshold.

As an example, the system further includes: a fourth controller terminal different from the first controller terminal, the second controller terminal and the third controller terminal; wherein the third controller terminal is configured to receive a third voltage; wherein the system is further configured to: generate a fourth voltage based at least in part on the third voltage; and output the fourth voltage through the fourth controller terminal to a gate terminal of a transistor. For example, the system further includes an output detector configured to receive the first voltage and the second voltage and generate a first control signal and a second control signal based at least in part on the first voltage and the second voltage. As an example, the system further includes: an output damper configured to receive the first control signal and generate the first current based at least in part on the first control signal; and a pulse generator configured to receive the second control signal and generate the second current based at least in part on the second control signal.

For example, the output detector is further configured to determine an output voltage to be equal to the first voltage minus the second voltage. As an example, the output detector is further configured to: if the determined output voltage increases with time, generate the first control signal to enable the output damper and generate the second control signal to disable the pulse generator; and if the determined output voltage exceeds a first threshold, generate the first control signal to enable the output damper and generate the second control signal to disable the pulse generator. For example, the output detector is further configured to: if the determined output voltage decreases with time, generate the first control signal to disable the output damper and generate the second control signal to enable the pulse generator; and if the determined output voltage falls below a second threshold, generate the first control signal to disable the output damper and generate the second control signal to enable the pulse generator. As an example, the output damper is further configured to: in response to being enabled by the first control signal, generate the first current; and in response to being disabled by the first control signal, not generate the first current. For example, the pulse generator is further configured to: in response to being enabled by the second control signal, generate the second current; and in response to being disabled by the second control signal, not generate the second current.

According to some embodiments, a method for controlling synchronous rectification includes: receiving a first voltage at a first controller terminal; receiving a second voltage at a second controller terminal; if a voltage difference from the first controller terminal to the second controller terminal satisfies one or more first conditions, generating a first current to flow through the first controller terminal; and if the voltage difference from the first controller terminal to the second controller terminal satisfies one or more second conditions, generating a second current to flow through the second controller terminal; wherein: the voltage difference from the first controller terminal to the second controller terminal is equal to the first voltage minus the second voltage; the one or more first conditions and the one or more second conditions are different; and the second current includes one or more current pulses. For example, the method is implemented according to at least FIG. 8.

According to certain embodiments, a method for controlling synchronous rectification includes: receiving a first voltage at a first controller terminal; receiving a second voltage at a second controller terminal; if a voltage difference from the first controller terminal to the second controller terminal satisfies one or more first conditions, generating a first current to flow through the first controller terminal; and if the voltage difference from the first controller terminal to the second controller terminal satisfies one or more second conditions, generating a second current to flow through a third controller terminal, the third controller terminal being different from the first controller terminal and the second controller terminal; wherein: the voltage difference from the first controller terminal to the second controller terminal is equal to the first voltage minus the second voltage; the one or more first conditions and the one or more second conditions are different; and the second current includes one or more current pulses. For example, the method is implemented according to at least FIG. 7.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for controlling synchronous rectification, the system comprising:
a first controller terminal configured to receive a first voltage; and
a second controller terminal biased to a second voltage;
wherein the system is further configured to:
if a voltage difference from the first controller terminal to the second controller terminal satisfies one or more first conditions, generate a first current to flow through the first controller terminal; and
if the voltage difference from the first controller terminal to the second controller terminal satisfies one or more second conditions, generate a second current to flow through the second controller terminal;
wherein:
the voltage difference from the first controller terminal to the second controller terminal is equal to the first voltage minus the second voltage;
the one or more first conditions and the one or more second conditions are different; and
the second current includes one or more current pulses.

2. The system of claim 1 wherein:
the first current flows into the system through the first controller terminal; and
the second current flows out of the system through the second controller terminal.

3. The system of claim 1 wherein the system is further configured to:
if the voltage difference from the first controller terminal to the second controller terminal during a voltage detection window increases with time, generate the first current to flow through the first controller terminal; and
if the voltage difference from the first controller terminal to the second controller terminal during the voltage detection window exceeds a first threshold, generate the first current to flow through the first controller terminal.

4. The system of claim 3 wherein the system is further configured to:
if the voltage difference from the first controller terminal to the second controller terminal during the voltage detection window decreases with time, generate the second current to flow through the second controller terminal; and
if the voltage difference from the first controller terminal to the second controller terminal during the voltage detection window falls below a second threshold, generate the second current to flow through the second controller terminal.

5. The system of claim 4 wherein the second threshold is smaller than the first threshold.

6. The system of claim 4, and further comprising:
a third controller terminal different from the first controller terminal and the second controller terminal;
wherein the system is further configured to:
generate a third voltage based at least in part on the first voltage; and
output the third voltage through the third controller terminal to a gate terminal of a transistor.

7. The system of claim 6 wherein after the third voltage changes from a first voltage level to a second voltage level, with a predetermined delay, the voltage detection window starts.

8. The system of claim 7 wherein:
the first voltage level is a logic high level; and
the second voltage level is a logic low level.

9. The system of claim 1, and further comprising an output detector configured to receive the first voltage and the second voltage and generate a first control signal and a second control signal based at least in part on the first voltage and the second voltage.

10. The system of claim 9, and further comprising:
an output clamper configured to receive the first control signal and generate the first current based at least in part on the first control signal; and
a pulse generator configured to receive the second control signal and generate the second current based at least in part on the second control signal.

11. The system of claim 10 wherein the output detector is further configured to determine an output voltage to be equal to the first voltage minus the second voltage during a voltage detection window.

12. The system of claim 11 wherein the output detector is further configured to:
if the determined output voltage increases with time, generate the first control signal to enable the output clamper and generate the second control signal to disable the pulse generator; and
if the determined output voltage exceeds a first threshold, generate the first control signal to enable the output clamper and generate the second control signal to disable the pulse generator.

13. The system of claim 12 wherein the output detector is further configured to:
if the determined output voltage decreases with time, generate the first control signal to disable the output clamper and generate the second control signal to enable the pulse generator; and
if the determined output voltage falls below a second threshold, generate the first control signal to disable the output clamper and generate the second control signal to enable the pulse generator.

14. The system of claim 13 wherein the output clamper is further configured to:
in response to being enabled by the first control signal, generate the first current; and
in response to being disabled by the first control signal, not generate the first current.

15. The system of claim 14 wherein the pulse generator is further configured to:
in response to being enabled by the second control signal, generate the second current; and
in response to being disabled by the second control signal, not generate the second current.

16. A method for controlling synchronous rectification, the method comprising:
receiving a first voltage at a first controller terminal;
receiving a second voltage at a second controller terminal;
if a voltage difference from the first controller terminal to the second controller terminal satisfies one or more first conditions, generating a first current to flow through the first controller terminal; and
if the voltage difference from the first controller terminal to the second controller terminal satisfies one or more second conditions, generating a second current to flow through the second controller terminal;
wherein:
the voltage difference from the first controller terminal to the second controller terminal is equal to the first voltage minus the second voltage;
the one or more first conditions and the one or more second conditions are different; and
the second current includes one or more current pulses.

* * * * *